United States Patent
Randall et al.

(10) Patent No.: US 11,567,870 B2
(45) Date of Patent: Jan. 31, 2023

(54) SNOOP FILTER WITH IMPRECISE ENCODING

(71) Applicant: Arm Limited, Cambridge (GB)

(72) Inventors: Joshua Randall, Austin, TX (US); Jamshed Jalal, Austin, TX (US); Tushar P. Ringe, Austin, TX (US); Jesse Garrett Beu, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/215,435

(22) Filed: Mar. 29, 2021

(65) Prior Publication Data
US 2022/0308999 A1    Sep. 29, 2022

(51) Int. Cl.
| | | |
|---|---|---|
| *G06F 12/08* | (2016.01) | |
| *G06F 12/0831* | (2016.01) | |
| *G06F 12/0891* | (2016.01) | |
| *G06F 12/084* | (2016.01) | |

(52) U.S. Cl.
CPC ........ *G06F 12/0831* (2013.01); *G06F 12/084* (2013.01); *G06F 12/0891* (2013.01)

(58) Field of Classification Search
CPC . G06F 12/0831; G06F 12/084; G06F 12/0891
See application file for complete search history.

(56) References Cited

U.S. PATENT DOCUMENTS

| | | | | |
|---|---|---|---|---|
| 2016/0062893 | A1* | 3/2016 | Tune | G06F 12/0831 711/146 |
| 2020/0042446 | A1* | 2/2020 | Mittal | G06F 12/0895 |
| 2022/0019534 | A1* | 1/2022 | Turner | G06F 12/0804 |

* cited by examiner

*Primary Examiner* — Masud K Khan
(74) *Attorney, Agent, or Firm* — Nixon & Vanderhye P.C.

(57) ABSTRACT

An apparatus comprises snoop filter storage circuitry to store snoop filter entries corresponding to addresses and comprising sharer information. Control circuitry selects which sharers, among a plurality of sharers capable of holding cached data, should be issued with snoop requests corresponding to a target address, based on the sharer information of the snoop filter entry corresponding to the target address. The control circuitry is capable of setting a given snoop filter entry corresponding to a given address to an imprecise encoding in which the sharer information provides an imprecise description of which sharers hold cached data corresponding to the given address, and the given snoop filter entry comprises at least one sharer count value indicative of a number of sharers holding cached data corresponding to the given address.

20 Claims, 12 Drawing Sheets

SNOOP FILTER WITH IMPRECISE ENCODING

BACKGROUND

Technical Field

The present technique relates to the field of snoop filters.

Technical Background

A data processing apparatus may comprise requester devices, a memory, and at least one cache. Data corresponding to an address in memory may be temporarily stored in a cache to allow the data to be accessed by a requester more quickly than if the data were stored in memory. When there are multiple requesters that may access data corresponding to an address from a cache or from memory and that may write data to a cache or memory, it may be the case that there are different versions of data corresponding to an address in different caches, or that the data in a cache is not the same as the data stored in memory. In this case, a coherency protocol may be used to ensure that a requester is able to access the most up-to-date version of data corresponding to an address.

Snoop circuitry can be provided that can control snoop transactions. In this case, when one requester issues a read or write transaction corresponding to an address which could be shared with other requesters, snoop transactions may be issued to each cache which could have a cached copy of the data, and manage changes in coherency state at those caches and/or responses to the requester with more up-to-date versions of the data as necessary.

A snoop filter can be provided which may contain entries that can be used to reduce snoop traffic by allowing snoop circuitry to determine when data is not cached at a particular location.

SUMMARY

In one example, the present technique provides an apparatus comprising:
  snoop filter storage circuitry to store snoop filter entries corresponding to addresses and comprising sharer information, and
  control circuitry to select which sharers, among a plurality of sharers capable of holding cached data, should be issued with snoop requests corresponding to a target address, based on the sharer information of the snoop filter entry corresponding to the target address, wherein
  the control circuitry is capable of setting a given snoop filter entry corresponding to a given address to an imprecise encoding in which:
    the sharer information provides an imprecise description of which sharers hold cached data corresponding to the given address, and
    the given snoop filter entry comprises at least one sharer count value indicative of a number of sharers holding cached data corresponding to said address.

In a second example, the present technique provides a method comprising:
  storing snoop filter entries corresponding to addresses and comprising sharer information,
  selecting which sharers, among a plurality of sharers capable of holding cached data, should be issued with snoop requests corresponding to a target address, based on the sharer information of the snoop filter entry corresponding to the target address, and
  setting a given snoop filter entry corresponding to a given address to an imprecise encoding in which:
    the sharer information provides an imprecise description of which sharers hold cached data corresponding to the given address, and
    the given snoop filter entry comprises at least one sharer count value indicative of a number of sharers holding cached data corresponding to said address.

Further examples, features and advantages of the present technique will be apparent from the following description of examples, which is to be read in conjunction with the accompanying drawings.

DESCRIPTION OF EXAMPLES

Figure 1:
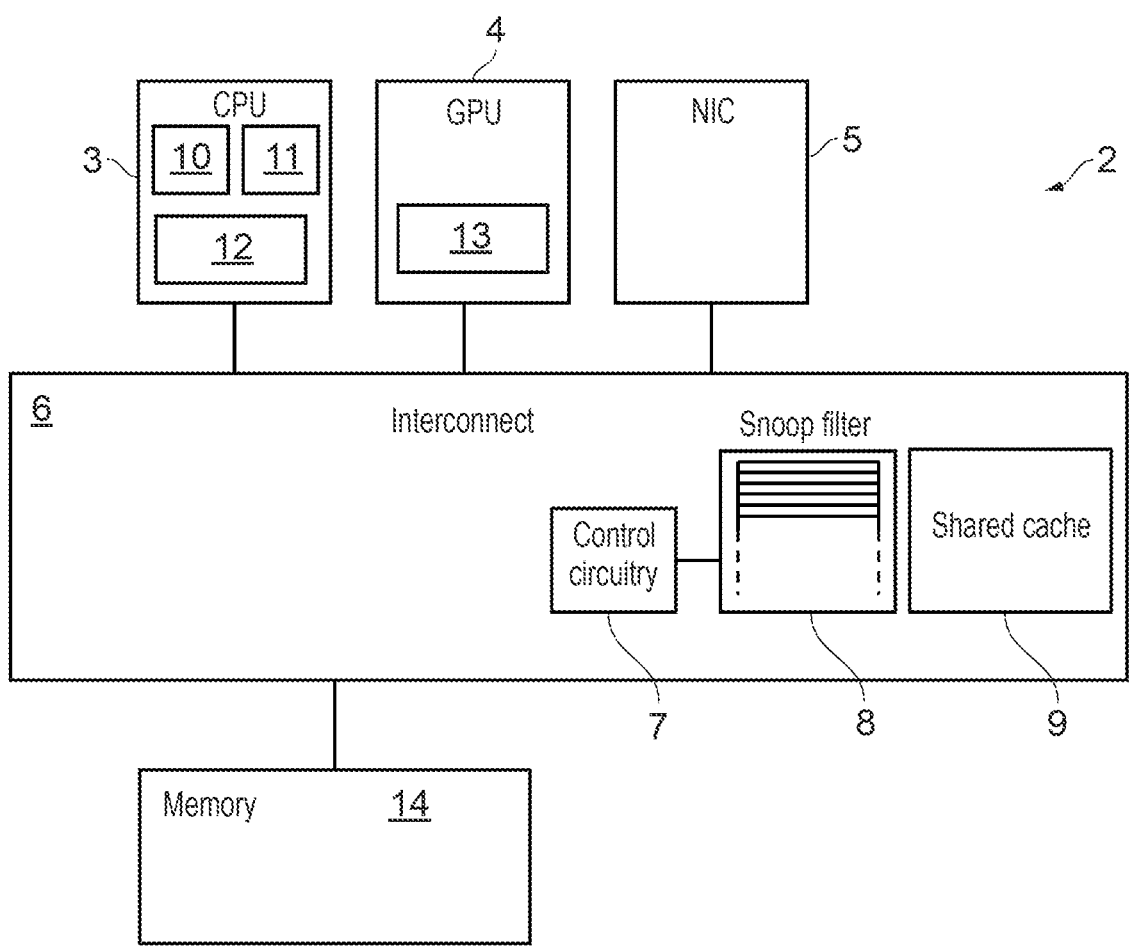
FIG. 1 shows a data processing system comprising a snoop filter and control circuitry.

A snoop filter comprises a plurality of entries, each entry corresponding to an address in a storage location. Each entry comprises sharer information which may be used to identify sharers that hold cached data corresponding to the address. A sharer may be, for example, a cache that holds data corresponding to the address. For example, a cache may be a private cache associated with a particular processing element (e.g. processor core, CPU (central processing unit) or GPU (graphics processing unit)), or a cluster cache shared between a cluster of processing elements (a subset of the total number of processing elements). The sharer information may be used when issuing snoop requests to identify which sharers do not hold a copy of data corresponding to the address in order to reduce the number of snoop requests issued and reduce snoop traffic. It is not necessary to issue a snoop request to a sharer that is indicated as not holding a copy of data corresponding to an address. Providing a snoop filter thus reduces the total number of snoop requests that may be sent.

One approach to providing sharer information is to set a precise snoop filter entry corresponding to an address with an indicator for each potential sharer that may hold a copy of data corresponding to the address. For example, there may be a flag associated with each sharer which in one state (for example if the flag is set to 0) may indicate that the sharer does not hold a copy of data corresponding to an address and in another state (for example if the flag is set to 1) may indicate that the sharer does hold a copy of data corresponding to the address. In this way, control circuitry can decide not to send snoop requests to those sharers associated with a flag that indicates that they do not hold a copy of data corresponding to an address. The control circuitry may monitor transactions in a data processing system, and can determine whether to set an indicator to one state or another depending on the monitored transactions. For example, if control circuitry monitors a transaction issued by a sharer that indicates the sharer no longer holds data corresponding to an address (for example a message indicative of a cache eviction from that sharer), the control circuitry may set the indicator corresponding to that sharer in the corresponding snoop filter entry to a value indicating that the sharer does not hold data corresponding to the address (sets the flag to 0, for example). When all of the indicators indicate that no sharers hold a copy of data corresponding to an address, the corresponding snoop filter entry may be deallocated or replaced as there are no sharers holding data corresponding to the address.

Providing an indicator for every sharer in a system capable of holding cached data corresponding to an address may use a large amount of storage, and therefore incur a high hardware cost. For example, maintaining a large snoop filter storage may incur high power usage and/or require a large area on a chip. Also, the circuit area and power cost associated with any comparison logic for checking precise sharer information corresponding to each sharer increases. This hardware cost becomes larger as the number of sharers in an apparatus increases.

An alternative approach to providing sharer information is to set an imprecise snoop filter entry corresponding to an address. In an imprecise snoop filter entry, it may not be indicated whether or not a particular sharer holds data corresponding to an address at the granularity of a sharer, but sharers may be indicated less precisely, e.g. by grouping sharers into groups. For example, an indicator (such as a flag) may be allocated to groups of M sharers. Groups may contain different numbers of sharers or may each be the same size. The indicator may in one state indicate that no sharers in the group hold a copy of data corresponding to an address, but in another state indicate that at least one sharer in the group holds a copy of data corresponding to the address. Therefore, control circuitry can decide to issue snoop requests to every sharer in the group if the indicator indicates that one of the sharers may hold a copy of data corresponding to an address. This may mean that some sharers that do not hold a copy of data corresponding to an address are still issued with snoop requests, but it ensures that sharers that do hold a copy of data corresponding to an address are snooped. The total number of snoop requests issued is still reduced compared to the case where no snoop filter is provided as snoop requests are not issued to groups of sharers that are indicated as not holding said data. Providing an imprecise snoop filter entry can allow the hardware cost associated with storing the snoop filter entries to be reduced significantly. For example, for an implementation using a flag per group of sharers as the imprecise sharer information, if sharers are grouped in groups of M then the number of bits used to represent the sharer information in a snoop filter entry may be reduced by up to a factor of M. However, when control circuitry monitors transactions in a data processing system and observes a transaction that indicates a sharer no longer holds data corresponding to an address (such as a cache eviction), it is not generally possible to change the indicator to indicate that the group no longer holds data corresponding to an address as another member of the group may still hold said data. This is the case even when no other member of the group holds said data. As such, it may be the case that snoop filter entries indicate that a group of sharers hold data corresponding to an address even when none of the sharers do hold such data, these snoop filter entries becoming stale entries. These stale entries cannot be deallocated or replaced easily as it is not known whether an entry is stale or not by the content of the snoop filter entry alone. A snoop filter may therefore include many stale entries and this may cause a valid snoop filter entry to be evicted to make room for a new entry corresponding to a different address when it would have been better from a performance point of view to evict a stale entry. To determine whether an entry is stale, requests may be sent to each sharer in a group to determine whether any sharers in the group hold data corresponding to an address. These additional requests increase the level of undesirable traffic in a system.

In the techniques discussed below, an apparatus is provided which can set snoop filter entries to an imprecise encoding where the sharer information provides an imprecise description of which sharers hold cached data corresponding to a given address. The snoop filter entries in the imprecise encoding comprise at least one sharer count value indicative of a number of sharers holding cached data corresponding to a given address. For example, there may be a single sharer count value representing the total number of sharers holding cached data corresponding to the address. Alternatively, there may be a plurality of sharer count values. In some examples, the sharer information comprises the at least one sharer count value. In some examples the sharer information can be separate from the at least one sharer count value.

Providing at least one sharer count value can make it easier to identify which entries in a snoop filter are stale entries without sending any additional requests, and can therefore improve utilisation of storage in a snoop filter and reduce the overhead in determining whether a given snoop filter entry has become stale.

In some data processing systems, a sharer may no longer hold cached data corresponding to an address, but not issue a transaction that indicates this. For example, a cache may silently evict an entry. As such, control circuitry may not be able to precisely set a sharer count value. Despite this, higher sharer count values will generally be indicative of more sharers holding data corresponding to an address, and lower sharer count values indicative of fewer sharers holding said data. Hence, even in a system which supports silent eviction, it can be useful to maintain the sharer count. Therefore, it will be appreciated that while the given snoop filter entry is indicative of the number of sharers, it is not essential for the given snoop filter entry to precisely track the exact number of sharers currently holding cached data.

In some examples, the imprecise encoding may be the only encoding supported for snoop filter entries.

In some examples, it is also possible for control circuitry to set a given snoop filter entry for a given address to a precise encoding which can provide a description of at least one sharer indicated as holding data corresponding to the address. For example, at least one sharer identifier may be provided in an entry in the precise encoding, which indicates one or more sharers which are indicated as holding data corresponding to the given address. It may not be necessary to provide any indication of the sharers that do not hold data corresponding to the address, as this can be implied from the entry omitting their sharer identifier. In this way, snoop requests may only be sent to the sharer(s) identified in the precise entry, reducing snoop traffic. By allowing control circuitry to set a snoop filter entry to a precise encoding, the total snoop traffic associated with the address corresponding to a precise snoop filter entry can be reduced. That is, by individually identifying the sharers that may hold cached data corresponding to an address, snoop requests may be issued to those identified sharers and it is not necessary to snoop other sharers. By comparison, if a snoop filter entry is set to an imprecise encoding, snoop requests may be sent to a wider group of sharers instead of to individual sharers. Therefore, the precise encoding allows a reduction in snoop traffic over an imprecise encoding. By allowing control circuitry to set a snoop filter entry to have an imprecise encoding, the area/power cost associated with that entry may be reduced compared to the case where the entry is set to a precise encoding which supports the maximum number of sharers all being identified precisely. Constraints on the total area/power cost that may be associated with a snoop filter may limit the number of entries that can be represented in a precise encoding, and therefore the provision of an imprecise encoding can allow more efficient use of power and area. Hence, supporting both precise and imprecise encodings can provide a better balance between reducing snoop traffic and reducing circuit area and power at the snoop filter.

In some examples, it is possible for the control circuitry to switch a given snoop filter entry between an imprecise encoding and a precise encoding. In one example, a snoop filter entry may be in the imprecise encoding indicating that any sharer of at least one group of sharers may hold data corresponding to an address, but control circuitry monitors a transaction from a sharer requesting that the sharer uniquely holds cached data corresponding to the given address. For example, the sharer may be a cache associated with a processor core that wants unique access to data corresponding to an address so that it can perform a series of operations on the cached data without needing to check with the interconnect between each operation. Upon approval of the unique request, the snoop filter entry may be set to a precise entry identifying the one sharer that issued the unique request as the sharer holding data corresponding to the address.

The precise encoding may be limited to indicate a certain maximum number of sharers to reduce the hardware cost of the snoop filter. In this case, the maximum number of sharers that can be indicated by a snoop filter entry in the precise encoding may be less than the total number of sharers that can be supported by the snoop filter. Purely by means of example, a snoop filter entry in the precise encoding may comprise X bits to represent sharer information, each unique sharer identifier in the precise encoding may comprise Y bits, and the value int(X/Y) may be less than the total number of potential sharers N that can be supported by the snoop filter. When a snoop filter entry is in the precise encoding and identifies the maximum number of sharers, an update to the snoop filter entry may indicate that a new sharer has requested access to data corresponding to the address, and therefore the precise encoding does not have sufficient encoding space to represent the new number of sharers in the precise encoding. In this case, upon receiving such a request, the control circuitry may switch a given snoop filter entry from the precise encoding to the imprecise encoding.

In some examples, control circuitry may set a predetermined subset of snoop filter entries to a precise encoding and a separate predetermined subset of entries to an imprecise encoding. Under certain conditions, an entry may be deallocated from one of the precise or imprecise set of snoop filter entries and allocated to the other one of the precise or imprecise set of entries. For example, as discussed above, if an entry set in the precise subset of entries identifies the maximum number of sharers, an update to the snoop filter entry indicating a new sharer request may cause control circuitry to deallocate the snoop filter entry from the precise subset of entries and allocate an entry corresponding to the address in the imprecise subset of entries.

In some examples, a given snoop filter entry may comprise an encoding indicator indicative of whether the entry is in the precise encoding or the imprecise encoding. In some examples this indicator may be a flag, which in one state indicates that the entry is in the imprecise encoding and in another state indicates that the entry is in the precise encoding. The indicator may be used by circuitry to interpret the bits of a snoop filter entry in the correct way for each type of encoding. In some examples, the encoding indicator can be interpreted as sharer information (as the encoding indicator may affect which sharers are issued with snoop requests).

In some examples, control circuitry may identify an opportunity to switch the entry from the imprecise encoding to the precise encoding, based on the at least one sharer count value of the snoop filter entry. For example, if an opportunity to switch the entry from the imprecise encoding to the precise encoding is identified, then probing requests may be sent to each sharer indicated as holding cached data corresponding to an address in the imprecise encoding (or broadcast to all sharers in some examples). The responses to these probing requests can indicate which of these sharers actually holds the data corresponding to the address, on the basis of which the entry may be switched to the precise encoding uniquely identifying those entries. The count value can be useful to avoid unnecessarily incurring the performance and power cost of issuing the probing requests, as if the count value indicates a relatively high number of sharers, even considering the possibility of silent evictions it may be relatively unlikely that there are few enough sharers to allow switching to the precise encoding. For example, if a sharer count value of a snoop filter entry in the imprecise encoding indicates that a number of sharers represented by the entry is less than the maximum number of sharers that can be represented as holding cached data for the given address by the precise encoding (or in some examples, that the number of sharers is smaller than a threshold, which may be set a little above the maximum number of sharers that can be represented in the precise encoding, to allow for the possibility of some silent evictions), then this may be identified as an opportunity for switching, and so the probing requests may be sent so that the responses can be used to confirm the true number of sharers holding the data and, if it is possible to switch to the precise encoding, which specific sharers should be indicated as holding the cached data.

The snoop filter storage circuitry and control circuitry according to the present technique may support a maximum of N sharers. Nevertheless, the snoop filter could be included within a processing system which has either N sharers or fewer than N sharers (the snoop filter could be integrated into a system which does not use the full number of sharers that could be supported by the snoop filter). In some examples, a snoop filter entry in the imprecise encoding may be encoded in fewer than N bits. If the entry were provided in a precise encoding capable of representing each sharer simultaneously at the granularity of a single sharer, then in order to be capable of representing each sharer simultaneously the entry would require at least N bits (1 bit per sharer in the optimal case that each sharer is associated with a 1-bit flag). However, in some examples the imprecise encoding is capable of representing both the sharer information and at least one sharer count value in fewer than N bits. This allows the snoop filter storage to occupy less storage space if the imprecise encoding is used than if each entry were to be represented in a precise encoding capable of representing each sharer simultaneously, and therefore reduces the hardware cost associated with the snoop filter.

In some examples, the sharer information in the imprecise encoding comprises a plurality of coarse sharer values. For example, a plurality of coarse sharer values may be provided, with each sharer value corresponding to a group of potential sharers. Each sharer value may comprise an indicator indicative of whether the group of sharers associated with the coarse sharer value contains at least one sharer holding cached data corresponding to a given address. Each group of sharers may be exclusive, such that if a sharer corresponds to one group of sharers then it may not correspond to any other group of sharers. Further, each group of sharers may comprise a proper subset of the total number of sharers that may hold data corresponding to the address. Therefore, control circuitry may issue snoop requests corresponding to an address to groups of sharers that are associated with an indicator that at least one sharer in the group may hold cached data corresponding to the address, and may exclude sending snoop requests to groups of sharers that are associated with an indicator indicating that no sharer in that group holds the cached data.

In another example, a plurality of sharer count values are provided, with each sharer count value corresponding to a group of potential sharers. Each sharer count value may represent the number of sharers within the corresponding group of sharers that hold cached data corresponding to the address. Therefore, control circuitry may issue snoop requests corresponding to an address to the groups of sharers that are associated with a non-zero count value, and may exclude sending snoop requests to the groups of sharers that are associated with a zero count value indicating that no sharer in that group holds the cached data.

In some examples, when a snoop filter entry is in the imprecise encoding, an entry may be deallocated when the at least one sharer count value in the entry is zero. For example, if there is a single sharer count value in the entry, the entry may be deallocated when that count reaches zero, as this would indicate that no sharers hold cached data corresponding to the address. In this way, imprecise snoop filter entries may be deallocated when they become less useful. Using such a technique allows an improved utilisation of snoop filter storage, as storage space would not be occupied by unnecessary stale entries. Furthermore, this technique does not issue probing requests to all sharers that may hold cached data corresponding to the address in order to identify a stale entry, reducing snoop traffic. As another example, if there are a plurality of sharer count values in a snoop filter entry, the entry may be deallocated when each sharer count in that snoop filter entry reaches a value of zero. Alternatively, entry deallocation may occur at a predetermined threshold value of the at least one sharer count value other than zero (e.g. recognising that silent evictions may occur, so a snoop filter entry with a non-zero sharer count value could still be stale), although probing requests may need to be issued to sharers that may hold cached data corresponding to the address in the case that entries are deallocated at a sharer count value other than zero in order to ensure that the true sharer count is zero. Alternatively, in the case when entry deallocation occurs at a threshold other than zero, sharers that may hold cached data corresponding to an address when an entry corresponding to that address is evicted from a snoop filter at a sharer count value other than zero may be issued with invalidation requests to request invalidation of the data at that sharer, to ensure the count of sharers for that address is effectively zero.

In another example, snoop filter entries in the imprecise encoding may be prioritised for replacement based on a number of sharers indicated by the at least one sharer count value. Hence, snoop filter entry replacement may be controlled based on the at least one sharer count value. For example, snoop filter storage may be unable to allocate a new snoop filter entry corresponding to an address without replacing an existing entry. For example, snoop filter storage circuitry may comprise a fully associative cache holding a maximum number of snoop filter entries, and therefore that cache is full. Alternatively, the snoop filter storage circuitry may comprise a set-associative cache, and it may be desirable to allocate a new snoop filter entry to a given set, but that set is full (even if there is space in another set, so the snoop filter as a whole is not full). In any case, an existing snoop filter entry may be evicted to make space for the new entry. In order to determine which snoop filter entry to replace, in some examples the control circuitry may take into account at least one sharer count value of each entry in the imprecise encoding. For example, an entry may be a higher priority for replacement if it has a lower value of at least one sharer count value. If there is only one sharer count value, an entry may be prioritised for replacement if the sharer count value is zero. Alternatively, for example if no entries are zero, the order of priority for replacement may start with the entries with the lowest sharer count value and then the next lowest sharer count value and so on. Prioritising entries in this manner may mean that entries which have no active sharers are replaced with a higher priority than those with many active sharers. Snoop traffic will only be reduced for addresses for which snoop requests are likely to be issued, which are addresses with at least one sharer holding cached data. If an entry corresponds to an address for which there are no active sharers, it is unlikely that snoop requests will be issued for that address (as it is unlikely that data access requests will be issued for that address), and therefore the storage space allocated to that entry may be better used for storing an entry corresponding to a different address. Prioritising replacement of these snoop filter entries therefore means that overall snoop traffic can be reduced.

If there are a plurality of sharer count values in a snoop filter entry, control circuitry may prioritise replacement of entries based on these values in a variety of ways. For example, entries with a higher number of zero sharer count values may be prioritised for replacement. Alternatively, or in addition to this, entries may be prioritised for eviction based on the value of the sum of at least two sharer count values. In one example, the highest priority entries for eviction are those with a lowest value of the sum of all sharer count values.

In all decisions regarding which entry to replace or evict, other considerations may be taken into account such as which snoop filter entry has been most recently used, so when prioritising snoop filter entry replacement based on the at least one sharer count value, the at least one sharer count value may be just one criterion to consider in a multi-factor selection taking into account multiple selection criteria.

The snoop filter storage circuitry and control circuitry according to the present technique may support a maximum of N sharers. If there is a single sharer count value in the imprecise encoding, that sharer count value may be used to represent up to N sharers. Alternatively, if there are a plurality of sharer count values, each corresponding to a group of M sharers, each sharer count value may be used to represent up to a maximum of M sharers, where M<N. If a counter is represented as a numerical value in binary, the number of bits required to represent Z states is $\log_2(Z)$. In the case of a sharer count value used to represent up to M sharers, it is desirable to distinguish 0 and M sharers. Consider an example with 4 sharers. $\log_2(4)=2$, therefore 2 bits can represent 4 different states (00, 01, 10, 11). However, if there are 4 sharers, distinguishing each number of sharers (including 0) requires indications of 0, 1, 2, 3, or 4 sharers—5 different states. As such, a sharer count value capable of distinctly representing M sharers can be encoded with $\log_2(M)+1$ bits, the extra bit to account for the fact that 0 and M sharers are distinctly represented.

In some examples where a group of sharers corresponding to a sharer count value comprises a maximum of M sharers, the sharer count value may be a limited saturating counter encoded with fewer than $\log_2(M)+1$ bits. For example, M may be equal to N in the case of a snoop filter entry in which one sharer count value is provided and all sharers are in the group mapped to that one sharer count value. Alternatively, M may be a number less than N in the case that a plurality of sharer count values are provided. A saturating counter may be incremented up to a certain value, at which any further attempts to increment do not increase the value of the counter. In some examples the saturating value of the counter is the maximum value that can be represented by the number of bits encoding the counter. For example, a 2-bit counter may saturate at a value of 3, and when the value of the counter is 0-2, it functions as usual. However, when the counter is at 3, a request to increment the counter leaves the counter at 3 instead of increasing to 4 (which in a 2-bit case would not be representable by the counter or would cause the counter to rollover to 0 for a non-saturating counter). A decrement from 3 would be handled as usual, decrementing the counter to 2. If a sharer count value is a saturating counter encoded with $\log_2(M)+1$ bits or more, the counter may saturate at a higher value than the value needed to represent a maximum number of sharers.

However, if the saturating counter is a limited saturating counter encoded with fewer than $\log_2(M)+1$ bits, the saturating value of the counter can be lower than the number of sharers in the group of sharers associated with the counter. In this case, if the number of sharers reaches the saturating value at a given point, the limited saturating counter is not expected to be indicative of the actual number of sharers in the corresponding group. However, it may be the case that the number of sharers that a sharer count value is used to represent during usual operation is much less than the maximum number of sharers in the group of sharers associated with that sharer count value. For example, a sharer count value may correspond to 16 sharers capable of holding cached data corresponding to an address, but only a few sharers may be expected to hold cached data corresponding to the address at any given time. In this case, providing a precise counter capable of indicating the full number of sharers may incur unnecessary area cost. By limiting the range of the counter, this avoids overprovisioning the counter for dealing with rare occurrences with large numbers of sharers. For usual usage the limited saturating counter acts as an ordinary counter capable of representing all sharers that may hold data corresponding to an address, and the times when the limited range of the counter is encountered may be relatively limited in practice. Given that the limited saturating counter is encoded in fewer than $\log_2(M)+1$ bits, the counter uses fewer bits of storage than a counter capable of representing all M sharers. This allows the snoop filter to incur lower hardware costs.

As discussed, if a limited saturating counter does reach the saturating value at a certain point, the value of that sharer count value is not indicative of the exact number of sharers. For example, several sharers may have requested to hold data corresponding to an address after the value reached the saturating value. It cannot be known how many additional sharers hold data corresponding to an address over this period as the counter was not able to be incremented. Therefore, to recover accuracy for a limited saturating counter after it has reached a saturating value, control circuitry may issue probe requests to all sharers that may hold data corresponding to an address, the responses to which can be used to set the sharer count value accurately (at least initially—it is noted that even when the counter is below the saturation point, the count value may still not track the number of sharers holding the cached data precisely, as there could have been some silent evictions by sharers not reporting the evictions to the snoop filter).

In some examples, probe requests are sent to sharers corresponding to a given limited saturating counter when the counter decrements to a certain predetermined value.

Precision recovery with a saturated counter may in some examples only issue probing requests when the saturating counter attempts to decrease from 1 to 0. The probing would recalculate the counter at this point to make sure that a 0-count is accurate.

In other examples, sharers may be probed at a different sharer threshold. For example, probe requests may be issued when a counter is decremented from the saturating value X to X−1. This provides a precise counter when not in the saturated state, requiring no cache probes unless the cache line reaches X sharers.

One further example would be to set the probe point at some intermediate threshold crossing value other than the minimum 1-to-0 transition or maximum (X)-to-(X−1) transition. This may strike a better balance between common cases of low sharer counts (which would probe heavily on 1-to-0 transitions) and high/all sharer counts (which would probe heavily on evictions any time true sharer counts>=X).

A snoop filter entry may comprise a line in a snoop filter storage component. In some examples, the snoop filter entry corresponding to an address may also comprise cached data corresponding to that address, in addition to the sharer information and sharer count value(s). In this way a snoop filter may also act as a shared cache for a system.

Alternatively, in other examples, the snoop filter may be a separate structure from a shared cache shared between the sharers for caching data.

In some examples, a race condition may arise when one sharer requests unique access to data corresponding to an address, and another sharer is in the process of evicting data corresponding to the address. As will be discussed in further detail later, if the eviction message from one sharer is received at a later time, the control circuitry could decrement a sharer count value incorrectly, which could lead to incorrect identification of a stale snoop filter entry. Some examples may send snoop requests to all sharers indicated as holding data corresponding to an address when one sharer requests unique access to data corresponding to that address. The snooped sharers may provide a response indicating whether they do or do not hold data corresponding to the address, and further may provide an up-to date copy of the data if they hold it. In some examples, information included in these snoop responses may be used to determine whether or not there is a risk of one of the snooped sharers being in the process of evicting data corresponding to an address. If the control circuitry determines that there is a risk of a pending eviction for a sharer holding data corresponding to an address, it may suppress the decrementing of a sharer count value corresponding to the address, or may set information indicating that a future message indicating an eviction not cause the sharer count value to be decremented. This can help avoid the race condition discussed above.

In some examples, the information included in the snoop responses used to determine the risk may be a pending eviction indicator. In one example, this may be a flag that can be set in one of two states, indicating either that the sharer corresponding to the snoop response is in the process of an eviction or that it is not. Other indicators may be used to represent this information.

In some examples, the information included in the snoop response used to determine the risk may be coherency state information. For example, coherency state information may comprise an indication of whether the data corresponding to the address in a particular sharer is clean, dirty, unique, shared, invalid, etc. This may be used to assess the risk of a pending eviction. For example, if coherency state information in a snoop response indicates that the coherency state for the address at a given sharer was "invalid" at the time when the snoop request was received, there may be a risk that an eviction message was pending at the time the snoop response was sent. In some examples, control circuitry may not decrement a sharer count value corresponding to a sharer in response to receiving a snoop response from that sharer specifying coherency state information indicating that the coherency state for the specified address at that sharer is an invalid coherency state. Granting a unique access request may be delayed until the counter reaches zero indicating that other sharers which previously held the data have all evicted their copy of the data. This approach means that if an eviction message from a particular sharer was still pending at the time the snoop request was received by that sharer, the corresponding snoop response will indicate that the current coherency state is invalid and so would not cause the counter to be decremented, and the actual decrementing of the counter may take place when the previously pending eviction message is subsequently received and processed by the snoop filter, avoiding the race condition.

FIG. 1 is a schematic diagram illustrating a data processing system 2 (e.g. an integrated circuit or system-on-chip) which includes a number of requester devices 3, 4, 5 and an interconnect 6 comprising control circuitry 7 for managing coherency between caches. In this example the requester devices include a central processing unit (CPU) 3 for performing general purpose processing, a graphics processing unit (GPU) 4 for performing graphics processing and a network interface controller (NIC) 5 for controlling transmission and reception of data over a network. The CPU includes caches e.g. level 1 caches 10 and 11 associated with particular cores and a shared level 2 cache 12. The GPU includes shared cache 13 (in practice, the cores of the GPU could also have individual caches). The NIC 5 has processing circuitry for controlling network packet transmission and reception, and a network interface for transmitting the packets to the network and receiving packets from the network, and has no caches of its own. Each of the requester devices 3, 4, 5 has a coherency interface (not shown) for interacting with the coherent interconnect 6. For example, the coherency interface may be responsible for generating the required coherency protocol transactions in response to cache accesses from the relevant requester, and responding to snoop requests from the control circuitry 7 with appropriate responses and changes of coherency state. It will be appreciated that this is just one example of some requester devices and other types of requesters could also be provided, such as display controllers for controlling display of data on a screen, or a DMA (direct memory access) controller for controlling transfer of data between memory and a peripheral device for example. Examples of coherency protocols which could be used are the AMBA® 4 ACE and AMBA® 5 CHI coherency protocols provided by ARM® Ltd of Cambridge, UK, but it will be appreciated that the techniques discussed herein could also be applied to other coherency protocols.

A system cache 9 is coupled to the coherent interconnect 6 but not assigned to a particular requester device. The system cache 9 may, for example, be provided to speed up access to data by uncached requesters such as the NIC 5, allowing faster access than if all reads and writes from the NIC 5 have to be served by main memory 14.

As shown in FIG. 1, the coherent interconnect 6 may include a snoop filter 8 within snoop filter storage circuitry for tracking which data addresses are cached at certain sharers. The snoop filter 8 can be used to reduce snoop traffic by allowing the control circuitry 7 to determine when data is not cached by a particular sharer.

A sharer may be any element in a system that can individually hold cached data corresponding to an address. For example, a single cache such as the cache 13 shown in FIG. 1 may be considered to be a sharer, as it holds cached data corresponding to addresses in memory 14 for the GPU 4. Alternatively, a combination of caches such as caches 10-12 may be considered as a single sharer. For example, in the case that L2 cache 12 is an inclusive cache including entries for any address cached in L1 caches 10 and 11, the caches 10 and 11 do not hold cached data separately to the cache 12, and the group of caches is considered to be one sharer.

Figure 2A:
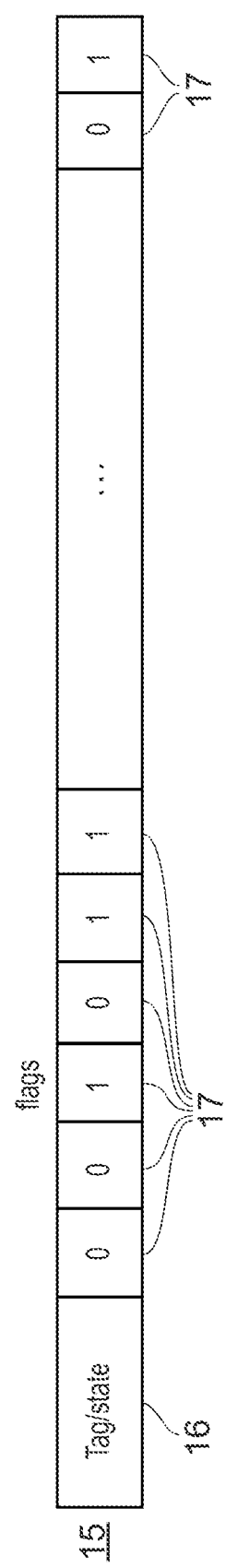
FIG. 2A shows a snoop filter entry in a full precise encoding providing a flag for each potential sharer.

FIG. 2A shows an example of a full precise snoop filter entry 15 that may be provided within the snoop filter 8. Snoop filter entry 15 provides tag/state information 16 with information identifying the entry. For example, a tag may associate the entry with an address in memory 14. The entry 16 may further provide information regarding the coherency state of the snoop filter entry. The full precise bit vector 15 also comprises 1-bit flags 17. Each flag 17 corresponds to one sharer in the data processing system 2. In the example of FIG. 1, a flag may be provided for the group of caches 10-12, and another flag for cache 13, for example. In the example of FIG. 2A each flag is set to 0 if the corresponding sharer does not hold a copy of cached data corresponding to an address, and to 1 if it does. When a request is issued to read or write data corresponding to an address, snoop requests may be issued by control circuitry 7 to the sharers with a flag indicating that the sharers hold data corresponding to the address. Snoop requests may not be issued to sharers associated with a flag of 0 (for example), because these sharers are unlikely to hold data corresponding to the address, and therefore there is unlikely to be a need to update coherency state within these sharers or provide up-to-date data from these sharers. Control circuitry 7 monitors transactions issued via the interconnect 6 such as read or write requests from requester devices 3, 4, 5, unique requests, and cache evictions. Each of these can be used to update the flag corresponding to a sharer. For example, if a transaction is issued indicating that a sharer has evicted data corresponding to an address, the flag 17 corresponding to that sharer may be set to 0. If a transaction indicates that data corresponding to an address is being allocated to a sharer, the flag 17 for that sharer is set to 1. If a unique request from one sharer is accepted, all sharers except that sharer evict the data corresponding to the address, and therefore all flags are set to 0 except the flag associated with the unique requesting sharer.

In FIG. 2A, a flag 17 is allocated to each potential sharer indicating whether it holds cached data or not. In large systems with many potential sharers, this can lead to inordinately large snoop filter entries when full precise bit vector entries 15 are provided.

Figure 2B:
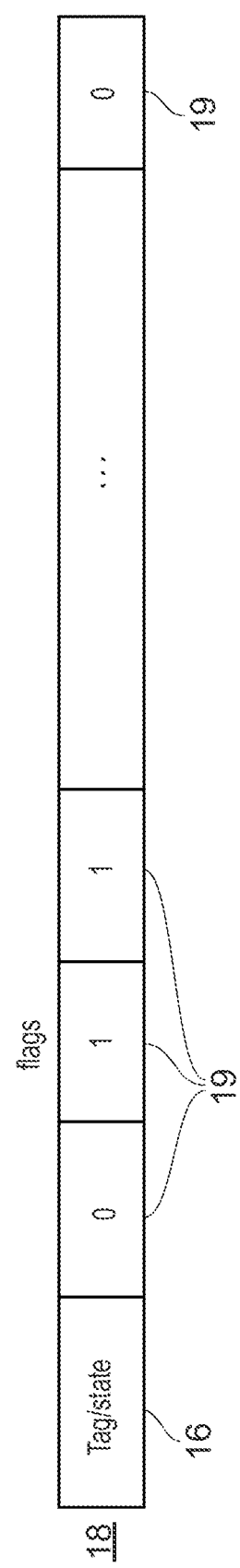
FIG. 2B shows a snoop filter entry in an imprecise encoding providing flags shared between potential sharers.

FIG. 2B shows an alternative encoding of a snoop filter entry as a coarse imprecise entry 18. As in FIG. 2A, tag/state information 16 is provided to identify an entry. The coarse imprecise entry 18 provides 1-bit flags 19, each flag 19 corresponding to M sharers. Each sharer in data processing system 2 is allocated a group, with each group comprising up to M sharers. Each group corresponds to one flag 19. Each flag 19 is set to one state (for example 0) if the group of sharers corresponding to that flag has no sharers holding cached data corresponding to the address. Alternatively, if any sharer in the group of sharers may hold cached data corresponding to the address, the flag is set to a second state (for example 1).

When snoop requests are issued by control circuitry 7 corresponding to an address where the snoop filter entry corresponding to that address is a coarse imprecise entry 18, requests may be issued to all sharers in groups associated with a flag of 1. The entry 18 uses fewer bits of storage than the entry 15 for the same data processing system, as fewer flags are provided.

However, when monitoring request/snoop traffic within the data processing system 2, control circuitry 7 is not generally able to switch a flag 19 of 1 to a flag of 0 upon monitoring a cache eviction. This is because a group of sharers associated with a flag 19 may have several sharers holding data corresponding to an address, and an eviction from only one of them will mean that several others still hold this cached data. Therefore, switching the flag 19 to 0 will be incorrect. This will be the case even if only 1 sharer in the group holds data corresponding to an address, because it is not known whether there is only 1 sharer or whether there are many. Therefore, it can be the case that all sharers in a group associated with a flag 19 evict data corresponding to the address, but the flag is not switched from 1 to 0. It may then be the case that a coarse imprecise entry 18 comprises at least one non-zero flag, but no sharers actually hold data corresponding to the given address. This entry is known as a stale entry. If there are a limited number of snoop filter entries in a snoop filter 8, and it is desirable to assign a new entry, an entry may be evicted. If there are both valid and stale entries in the snoop filter 8, a valid entry may be evicted to make room for the new entry, when there would be room for both if there were no stale entries.

One solution for managing stale entries is to send snoop requests to all sharers associated with a flag 19 of 1 in at least one entry. The responses to these requests can allow flags 19 to be set accurately. For example, if all responses to a snoop request sent to a group of sharers associated with a flag 19 of 1 indicate that they do not hold data corresponding to that address, the flag may be set to 0. However, this means a large amount of snoop requests are likely to be sent in the data processing system 2, which can use up bandwidth which could more usefully be used for other messages.

Figure 3:
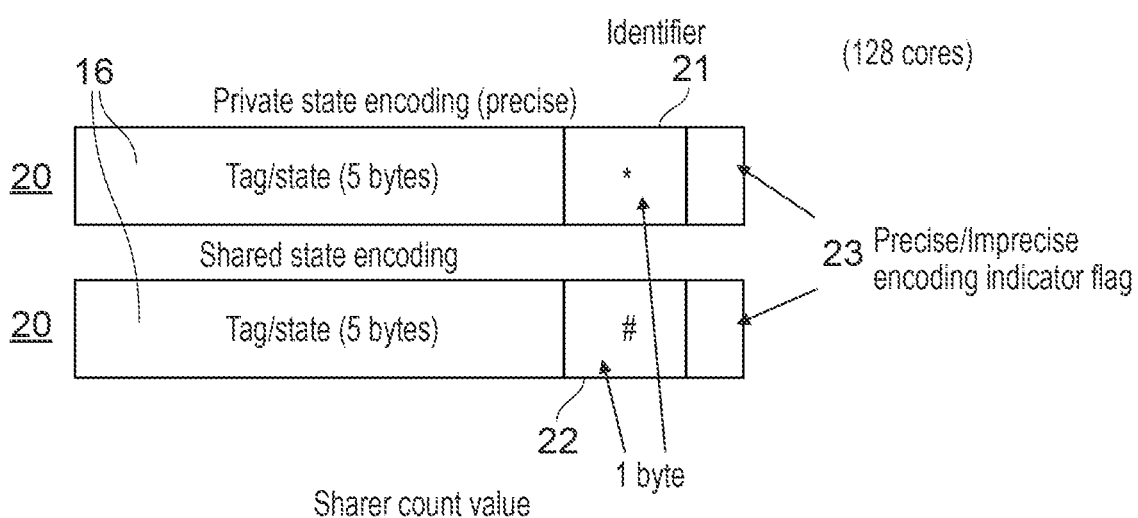
FIG. 3 shows a snoop filter entry comprising a precise representation of a sharer in one interpretation and a counter in another interpretation.

FIG. 3 shows a first example of a snoop filter entry according to the present technique. This example assumes that the snoop filter 8 supports up to 128 sharers in a data processing system 2, but the technique can of course be applied to systems with any number of sharers.

A snoop filter entry 20 may comprise tag/state information 16 as before.

In one encoding, shown in the top part of FIG. 3, the snoop filter entry 20 is in a precise encoding. In this case, in addition to the tag/state information 16, the snoop filter entry 20 comprises a single field 21 that can be used to uniquely identify a sharer. Therefore, if data corresponding to a given address is cached in only a single sharer, the precise encoding of snoop filter entry 20 can be used to uniquely identify that sharer. For example, if the snoop filter supports up to N potential sharers, this may be a $log_2(N)$-bit unique indicator of one sharer. In this example, the entry 20 will be able to be deallocated in the event that the single sharer evicts data corresponding to the address.

In a second encoding, shown in the bottom part of FIG. 3, the snoop filter entry 20 is in an imprecise encoding. In this case, in addition to the tag/state information 16, the snoop filter entry 20 comprises a sharer count value 22. The sharer count value 22 is indicative of the number of sharers in the system 2 that are indicated as holding cached data corresponding to the given address corresponding to the snoop filter entry. If the entry 20 is in the imprecise encoding and a sharer in the data processing system 2 evicts data corresponding to the address, the sharer count value 22 may be decremented by 1 by control circuitry 7. Likewise, if a sharer allocates an entry to store data corresponding to an address, the counter 22 may be incremented by 1. Other transactions within the system 2, such as unique requests, may also be used to increment or decrement the sharer count value 22. The sharer count value therefore provides a mechanism by which the number of sharers holding data corresponding to an address can be monitored.

In both encodings shown in FIG. 3 for snoop filter entry 20, an indicator 23 is provided which can be used to determine whether the entry is in the precise encoding or the imprecise encoding. In some examples, control circuitry 7 may use the indicator 23 to determine whether to send snoop requests to all sharers (if it indicates the imprecise encoding) or to one sharer (if it indicates the precise encoding) and if in the precise encoding, to consult field 21 to determine which sharer to issue with a snoop request.

Figure 4:
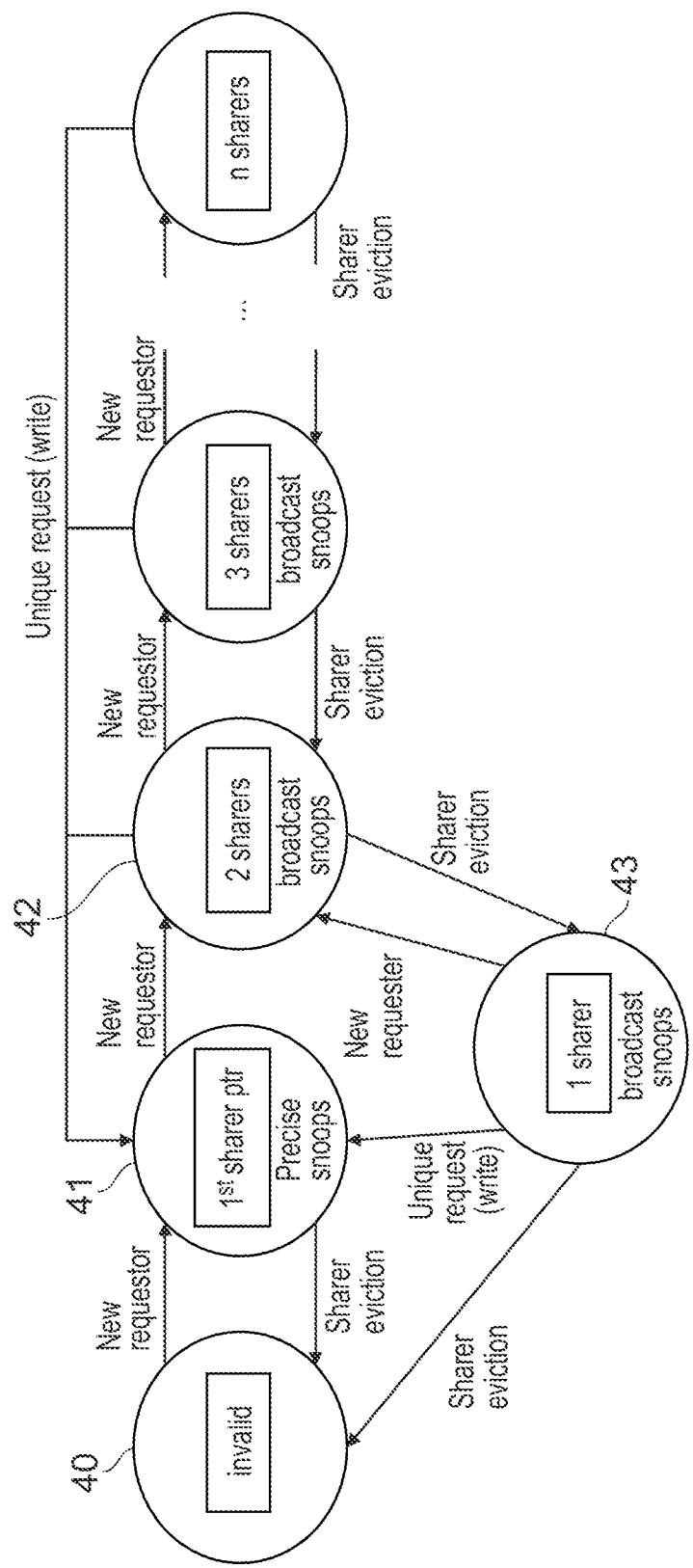
FIG. 4 shows a state diagram for the snoop filter entry of FIG. 3.

FIG. 4 is a state diagram providing a description of the use of a snoop filter entry 20 as shown in FIG. 3 within a data processing system 2.

When a snoop filter entry 20 corresponding to an address is in state 40, this indicates that no sharers hold cached data corresponding to the address. The snoop filter entry 20 may indicate this in the tag/state field 16, for example as coherency state information. Other methods may be used to identify invalid snoop filter entries 20, such as the status of a validity indicator corresponding to each entry.

Control circuitry 7 may detect a transaction indicating that a sharer has started holding cached data corresponding to the address. At this point, the snoop filter entry 20 is set in the precise encoding and the field 21 is set to precisely identify that sharer, changing the state of the snoop filter entry 20 to state 41. At this point, only the sharer indicated by field 21 is indicating as holding cached data corresponding to the address (although it could be possible that the sharer may silently evict the cached data without informing the snoop filter, so it is not guaranteed in the precise encoding that the sharer still holds the cached data).

If at this point the control circuitry 7 monitors a transaction indicating that the sharer no longer holds data corresponding to the address, for example a message indicative of a cache eviction, the snoop filter entry 20 is updated to reflect this by setting the entry to invalid. This transitions the state of the entry from state 41 to 40 as shown in FIG. 4.

Alternatively, if the snoop filter entry is in state 41 and the control circuitry monitors a transaction indicating that a further sharer requests cached data corresponding to an address, the encoding indicator 23 is set to indicate that the entry 20 is in the imprecise encoding, the field 21 is cleared and a sharer count value 22 is set to indicate that two sharers hold cached data corresponding to the address. This transitions the state of the entry 20 from 41 to 42 as shown in FIG. 4.

From the snoop filter entry state indicated in 42, further requests by sharers to hold cached data corresponding to the address increment the sharer count value 22 and evictions decrement the counter 22 while two or more sharers are indicated by the sharer count value.

When a snoop filter entry 20 is in the imprecise encoding and indicates that two sharers hold data corresponding to the address (state 42), a transaction that indicates that a sharer no longer holds cached data corresponding to the address (a message that indicates that one of the two sharers has evicted the cached data) decrements the counter by 1, and the state changes from 42 to 43.

The snoop filter entry 20 remains in the imprecise encoding, as it is not known which two sharers previously held cached data corresponding to the address, only that two sharers out of the plurality of sharers held cached data corresponding to the address.

An eviction from a sharer when the snoop filter entry 20 is in state 43, where one sharer is represented in the imprecise encoding, causes control circuitry to set the snoop filter entry to the invalid state 40.

With the snoop filter entry 20 in any state, control circuitry 7 may monitor a request for a sharer to uniquely hold data corresponding to an address. In the case that this request is accepted, every other sharer that holds data corresponding to the address will evict that data. Therefore, it can be known that the only sharer holding data corresponding to the address is the sharer corresponding to the unique request. In this case, when the snoop filter entry 20 starts in the imprecise encoding, the snoop filter entry 20 can be set to the precise encoding identifying the unique requesting sharer.

The issuing of snoop requests corresponding to an address with a snoop filter entry 20 will now be considered. If the entry is in the invalid state 40 either no requests will be issued (in a design for which a lack of a valid entry necessarily indicates no sharers), or snoop requests will be issued to every sharer (in designs where there is a possibility of a sharer holding data for a given address when there is no valid snoop filter entry for that address).

If the entry is in the state 41, a snoop request may be issued to the one sharer precisely identified by the field 21 in the precise encoding of the snoop filter entry 20.

If the entry is in the imprecise encoding, such as in states 42 and 43, a snoop request may be issued to every sharer.

In this way, the snoop filter 8 enables the total snoop traffic to be reduced by providing sharer information (the field 21 or the encoding indicator 23 for example) when snoop filter entries 20 according to FIG. 3 are provided. The number of snoop requests can be reduced to one request when an address has a snoop filter entry 20 in the precise encoding, and for entries in the imprecise encoding, snoop requests are issued to all sharers. Therefore, the total number of snoop requests issued can be reduced compared to the case where no snoop filter is provided (in which case snoop requests would need to be issued to all sharers each time a snoop is required for a given address as there would be no information about the number of sharers holding data for that address).

The snoop filter entry 20 of FIG. 3 uses fewer bits of storage than the full precise encoding of FIG. 2A, because a flag 17 is not provided for every potential sharer. In one example where a snoop filter supports up to 128 potential distinct sharers, the snoop filter entry 20 according to FIG. 3 uses 6 bytes of storage. In comparison, the full precise snoop filter entry of FIG. 2A uses 21 bytes for the same 128 sharers (5 bytes for the tag/state, the same as in FIG. 3, and 16 bytes of flags 17 for the 128 sharers). Therefore, the example of FIG. 3 provides a snoop filter entry 3.5× smaller than that of FIG. 2A.

In addition, the snoop filter entry 20 of FIG. 3 in the imprecise encoding does not encounter the issue of stale entries that the entry 18 of FIG. 2B does. This is because a sharer count value 22 is provided, so it can be known when no more sharers hold cached data corresponding to an address (or can be indicated that very few sharers hold cached data corresponding to an address, which may correspond to the case of no active sharers in a system supporting silent evictions).

Figure 5:
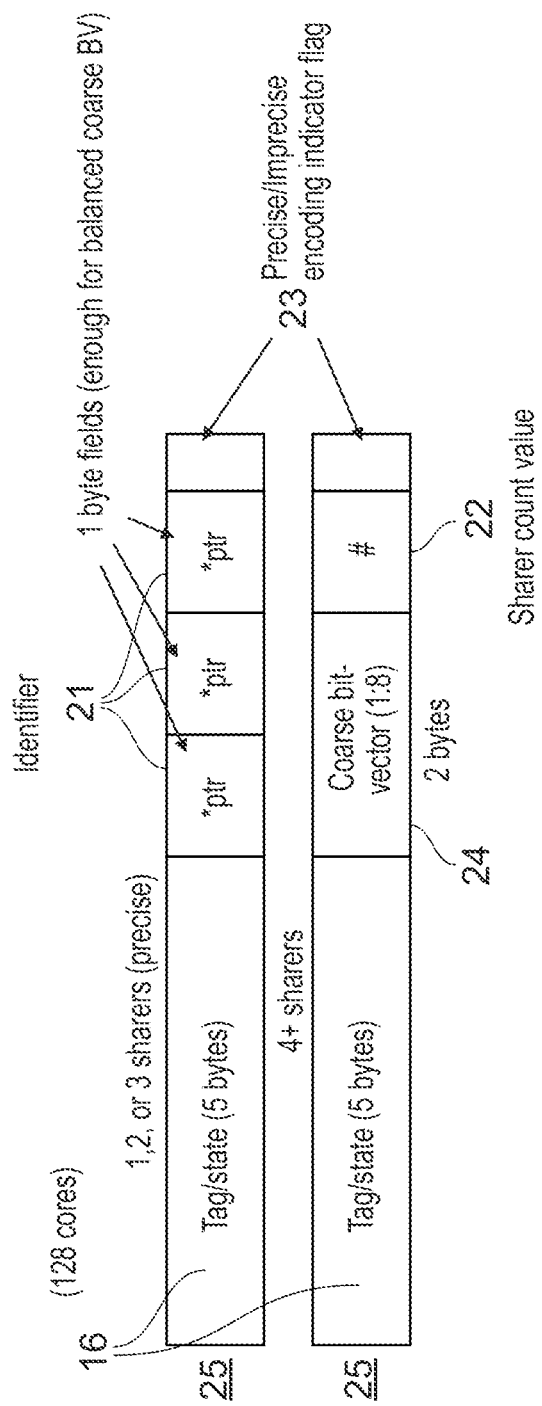
FIG. 5 shows a snoop filter entry comprising a precise representation of up to three sharers in one interpretation and a counter and a coarse representation of sharers in another interpretation.

FIG. 5 shows a further example of a snoop filter entry 25 according to the present technique. This snoop filter entry 25 will be described in a snoop filter capable of representing up to 128 distinct sharers, but of course could be applied to systems with any number of sharers.

A snoop filter entry 25 may comprise tag/state information 16 as before.

In both encodings shown in FIG. 5 for snoop filter entry 25, an indicator 23 is provided which can be used to determine whether the entry is in the precise encoding or the imprecise encoding, as in FIG. 3.

In the precise encoding of FIG. 5, shown as the top half of the figure, there are three precise sharer identifier fields 21. As such, a snoop filter entry 25 set to this encoding can precisely identify up to three distinct sharers that hold cached data corresponding to an address. One or more of these fields 21 may be set to a state that indicates that they do not identify a sharer. For example, if there is only one sharer that holds cached data, two entries may be set to this non-sharer state.

In the imprecise encoding of FIG. 5, shown at the bottom half of the Figure, a sharer count value 22 is provided, as before. In addition to this, a coarse bit vector field 24 is also provided. This functions in the same way as the fields 19 of FIG. 2B. That is, the coarse bit vector comprises a plurality of indicators. Each indicator corresponds to a group of sharers, and in one state indicates that no sharers in the group hold a copy of cached data corresponding to an address, and in another state indicates that at least one sharer in the group holds a copy of the data.

Figure 6:
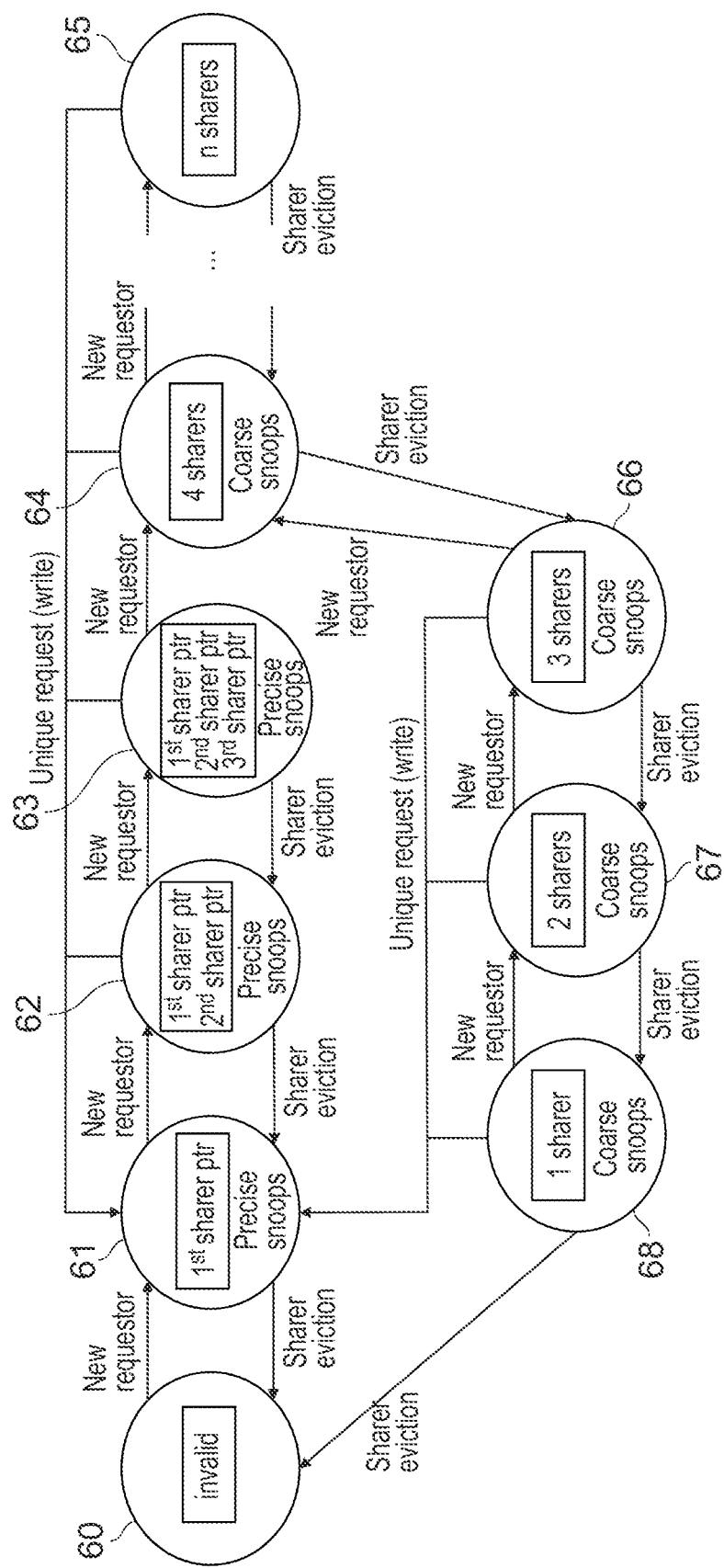
FIG. 6 shows a state diagram for the snoop filter entry of FIG. 5.

FIG. 6 is a state diagram providing a description of the use of a snoop filter entry 25 as shown in FIG. 5 within a data processing system 2.

When a snoop filter entry corresponding to an address is in state 60, this indicates that no sharers hold cached data corresponding to the address. The snoop filter entry 25 may indicate this in the tag/state field 16, as previously discussed.

Control circuitry 7 may detect a transaction indicating that a sharer has started holding cached data corresponding to the address. At this point, the snoop filter entry 25 is set in the precise encoding and one of the three fields 21 is set to precisely identify that sharer, changing the state of the snoop filter entry 25 to that shown in 61. At this point, only the sharer indicated by the filled field 21 holds cached data corresponding to the address.

If at this point the control circuitry 7 monitors a transaction indicating that the sharer no longer holds data corresponding to the address, for example a message indicative of a cache eviction, the snoop filter entry 25 is updated to reflect this by setting the entry to invalid. This transitions the state of the entry from 61 to 60 in FIG. 6.

Alternatively, if in state 61 the control circuitry 7 monitors a transaction indicating that a further sharer holds cached data corresponding to an address, a second field 21 is set to identify that second sharer, transitioning the state to 62 with two sharers precisely identified. Likewise, in response to a further transaction indicating that a third sharer holds data corresponding to the address, control circuitry sets a third indicator 21 to identify the third sharer.

If at any point while the snoop filter entry is in state 62 or 63 an eviction is monitored from any of the sharers indicated by fields 21, this causes the corresponding field to be evicted, and the snoop filter entry transitions to a state with one fewer sharer identified (transitions from state 63 to 62 or from 62 to 61).

In this manner, up to three sharers can be uniquely identified by snoop filter entry 25.

When the snoop filter entry is in state 63 it is in the precise encoding and identifies the maximum number of sharers permitted by the precise encoding. If control circuitry 7 monitors a transaction that indicates a further sharer will hold cached data corresponding to the address, there are no more fields 21 provided in the entry 25 to uniquely identify this sharer. In this case, the snoop filter entry 25 is set in the imprecise encoding.

The sharer count value 22 is set to indicate that four sharers actively hold cached data corresponding to the address. The encoding indicator 23 is set to indicate that the snoop filter entry 25 is in the imprecise encoding.

Further, the coarse bit vector field 24 is set to indicate that the groups of sharers comprising each of the four active sharers contain at least a sharer holding cached data corresponding to the address. One or more of the sharers may be in the same group as another sharer. This step functions in the same way as the description of FIG. 2B. In this way, the state of the snoop filter entry 25 transitions from state 63 to 64.

In state 64 there is a sharer count value 22 indicating the total number of sharers holding cached data corresponding to an address. There is also a coarse bit vector 24 indicating imprecisely which sharers hold data corresponding to the address. From here, if control circuitry 7 monitors a request for a new sharer to hold data corresponding to the address, the sharer count value 22 is incremented and the indicator corresponding to the group of sharers containing the requesting sharer is set to indicate that at least one sharer in that group holds the cached data (if the flag is not already set).

Alternatively, if at step 64 control circuitry monitors a request indicating that a sharer no longer holds data corresponding to the address, the sharer count value 22 is decremented by one. The coarse bit vector field 24 is not updated in this case, as in the case of imprecise snoop filter entry 18 shown in FIG. 2B.

From this point, new sharers requesting cached data corresponding to the address and sharers evicting data corresponding to an address simply causes the sharer count value to be incremented or decremented respectively, and the coarse bit vector 24 to be updated if necessary to indicate a sharer in a group of sharers. The snoop filter entry 25 remains in the imprecise encoding, as it is not known which sharers hold cached data corresponding to the address, only that a number of sharers indicated by the sharer count value hold cached data corresponding to the address. If three or fewer sharers are indicated by the sharer count value 22 and the snoop filter entry 25 is in the imprecise encoding, control circuitry 7 might identify this as an opportunity to transition from the imprecise encoding to the precise encoding, at which point probing snoop requests can be issued to those groups of sharers indicated by the field 24 as holding cached data corresponding to the address, and the responses to those snoops can be used to identify the sharers still holding cached data, so that the entry can be switched to the precise encoding in one of states 61, 62, 63. Alternatively, some examples may choose to issue those probing snoop requests even while in state 64 or another state corresponding to a number of sharers slightly above the threshold of 3 sharers, recognising that sometimes there may be silent evictions so even if the sharer count is 4 or greater, the true number of sharers holding the cached data may still be 3 or less and may permit a transition to the precise encoding.

An eviction from a sharer when the snoop filter entry 25 is in state 68, where one sharer is represented in the imprecise encoding, causes control circuitry to set the snoop filter entry to the invalid state 60.

At any point, control circuitry 7 may monitor a request for a sharer to uniquely hold data corresponding to an address. In the case this request is accepted, every other sharer that holds data corresponding to the address will evict that data. Therefore, it can be known that the only sharer holding data corresponding to the address is the sharer corresponding to the unique request. In this case, when the snoop filter entry 25 starts in the imprecise encoding, the snoop filter entry 25 can be set to the precise encoding identifying the unique requesting sharer in one of the three fields 21.

The issuing of snoop requests corresponding to an address with a snoop filter entry 25 will now be considered. If the entry is in the invalid state 60 either no requests will be issued, or snoop requests will be issued to every sharer.

If the entry is in the state 61, a snoop request may be issued to the one sharer precisely identified by the field 21 in the precise encoding of the snoop filter entry 25.

If the entry is in the state 62, a snoop request may be issued to the two sharers precisely identified by the fields 21 in the precise encoding of the snoop filter entry 25.

If the entry is in the state 63, a snoop request may be issued to the three sharers precisely identified by the fields 21 in the precise encoding of the snoop filter entry 25.

If the snoop filter entry 25 is in the state 64-68, a snoop request may be issued to every sharer in a group that corresponds to an indicator that the group contains a sharer holding cached data corresponding to an address. For example, if each group of sharers corresponds to a flag, which in state 0 indicates that no sharers in the group hold the cached data, and which in state 1 indicates that at least one sharer in the group may hold the cached data, a snoop request may be issued to every sharer associated with a group that corresponds to a flag in state 1.

In this way, the snoop filter 25 enables the total snoop traffic to be reduced by providing sharer information (the field 21 or the coarse bit vector field 24, for example) when snoop filter entries 25 according to FIG. 5 are provided. The number of snoop requests can be reduced to one, two, or three when an address has a snoop filter entry 25 in the precise encoding, and for entries in the imprecise encoding, snoop requests may only be issued to the groups of sharers that may hold cached data corresponding to an address. Therefore, the total number of snoop requests issued is reduced.

In addition, compared to the example of FIG. 2B, providing a sharer count value 22 in the imprecise encoding means that it can be identified when there are no sharers holding cached data corresponding to an address. Therefore, stale entries can be reduced by identifying those entries with no active sharers using the sharer count value 22.

The snoop filter entry of FIG. 5 uses fewer bits of storage than the full precise encoding of FIG. 2A, because a flag 17 is not separately provided for every potential sharer. In one example where a snoop filter entry supports 128 potential distinct sharers, the snoop filter entry 25 according to FIG. 5 uses 8 bytes of storage. In comparison, the full precise snoop filter entry 15 of FIG. 2A uses 21 bytes for the same system. Therefore, the entry of FIG. 5 provides a snoop filter entry 2.63× smaller than that of FIG. 2A.

The entry of FIG. 5 is larger than that of FIG. 3 (8 bytes compared to 6, 1.3× larger). However, it enables the precise tracking of three sharers instead of one, reducing the number of snoop requests that may be issued over a larger range of sharers.

Furthermore, the entry of FIG. 5 provides an imprecise encoding in which groups of sharers are associated with a flag, and snoop requests therefore may be issued to certain groups of sharers instead of all sharers when the entry is in the imprecise encoding.

However, both the entry of FIG. 3 and that of FIG. 5 provide a snoop filter entry comprising a sharer count value 22 and sharer information.

Figure 7:
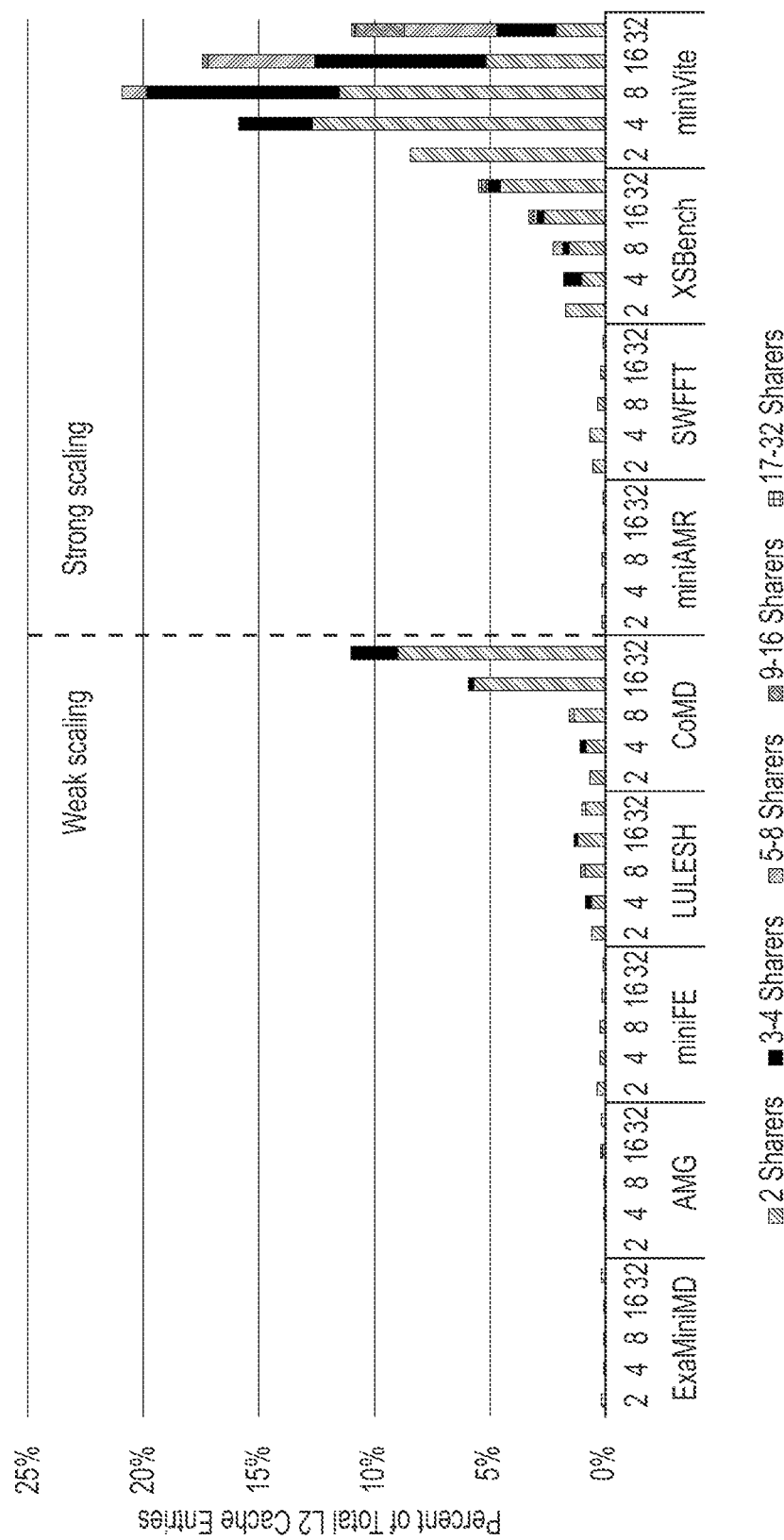
FIG. 7 is a graph showing the level of cache sharing for different workloads observed in a simulation of the workloads executing on a 32 core system.

FIG. 7 is a graph showing results from high performance computing (HPC) workloads. This data was compiled by sampling snoop filter state over the parallel execution of each workload. The x-axis provides different workloads, and the number of cores used in a simulation of the workloads. The y-axis provides a percentage representing the percentage of L2 cache entries that are shared with another cache when executing each workload. Each bar is separated to indicate the number of sharers for each cache entry that is shared with at least one other cache.

This data shows a trend that most cache line sharing occurs between 2 caches. This data shows that cache lines are rarely shared between more than 2 caches for these workloads, so a snoop filter entry such as that shown in FIG. 5, where up to 3 sharers can be indicated precisely, is likely to remain in the precise encoding when running these workloads.

The snoop filter entry 25 of FIG. 5 therefore benefits from reduced storage costs over the full precise example shown in FIG. 2A whilst having the same effect on the reduction of snoop traffic for most workloads, and also, through the implementation of a sharer count value, is not liable to stale entries (unlike the example of FIG. 2B, for example) in the case that it uses the imprecise encoding.

Figures 8, 9:
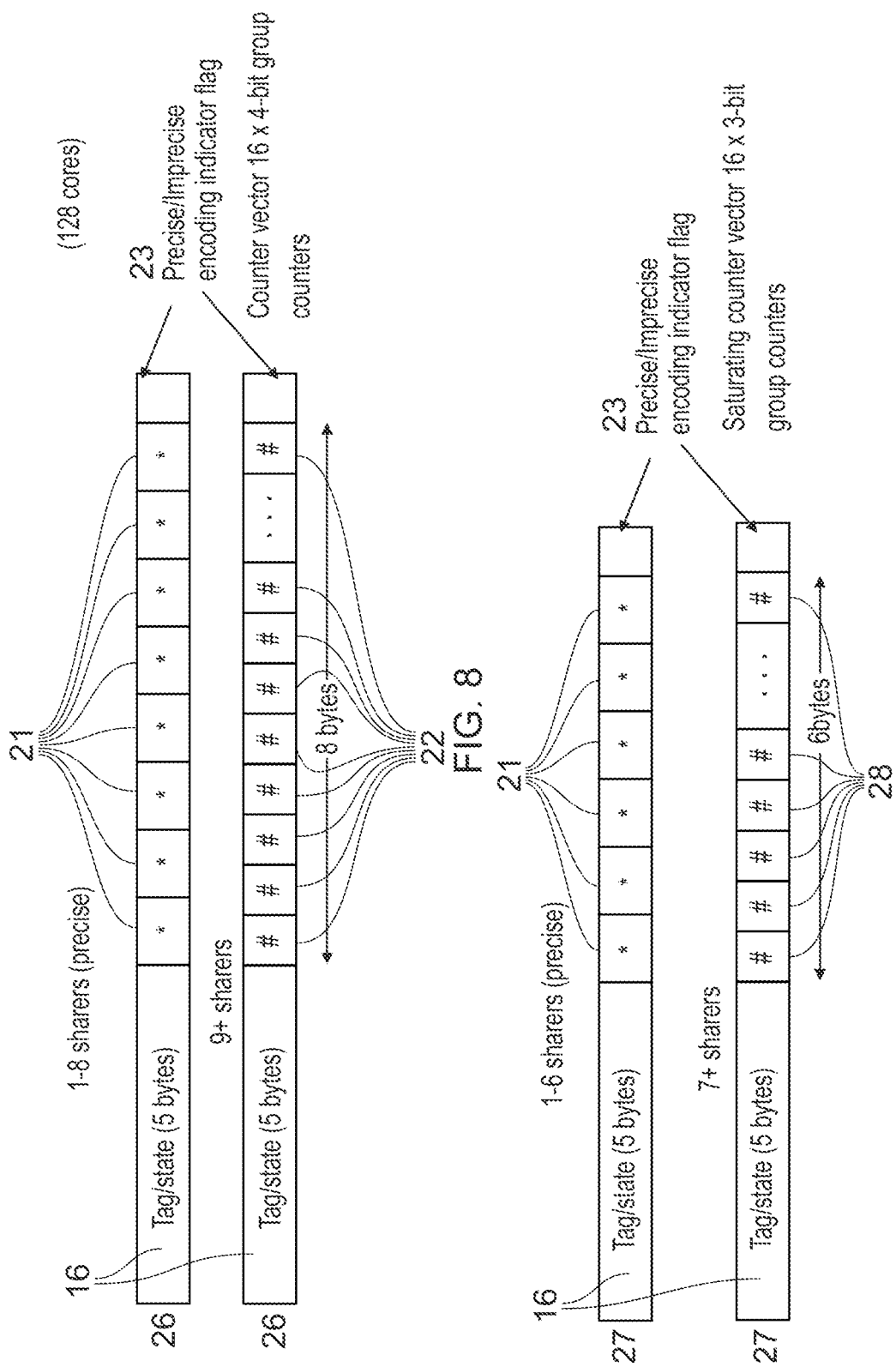
FIG. 8 shows a snoop filter entry comprising a precise representation of sharers in one interpretation and a plurality of counters in another interpretation.
FIG. 9 shows a snoop filter entry comprising a precise representation of sharers in one interpretation and a plurality of limited saturating counters in another interpretation.

FIG. 8 shows a further example of a snoop filter entry 26 according to the present technique.

This example assumes that a snoop filter can support up to 128 sharers in a data processing system 2, but the technique can be applied to systems with any number of sharers.

A snoop filter entry 26 may comprise tag/state information 16 as before.

In one encoding, shown in the top part of FIG. 8, the snoop filter entry is in a precise encoding. In this case, in addition to the tag/state information 16, the snoop filter entry 26 comprises eight fields 21 that can be used to uniquely identify a sharer. Therefore, if data corresponding to a given address is cached in between one and eight sharers, the precise encoding of snoop filter entry 26 can be used to uniquely identify those sharers.

In a second encoding, shown in the bottom part of FIG. 8, the snoop filter entry 26 is in an imprecise encoding. In this case, in addition to the tag/state information 16, the snoop filter entry 26 comprises a plurality of sharer count values 22. The sharer count values are each indicative of a number of sharers in a group of sharers within the system 2 that hold cached data corresponding to an address. For example, if a snoop filter can support up to N sharers, a group of sharers of the system may comprise M sharers with M<N, and the sharer count value 22 provides an indication of the number of sharers within that group that hold cached data corresponding to the address. In the example of FIG. 8, the snoop filter supports up to 128 sharers in the system, and each snoop filter entry in the imprecise encoding comprises 16 counters, each counter corresponding to a group of 8 sharers, therefore N=128 and M=8. The sharer count value 22 for each group of sharers indicates the number of sharers in the group that hold cached data corresponding to the address. This is therefore a value between 0 and 8 inclusive in the example of FIG. 8. In FIG. 8, each sharer count value is encoded as a 4-bit counter, assuming that a counter may be provided in $\log_2(M)+1$ bits to represent up to M sharers.

When there are eight or fewer sharers in a system, the precise encoding shown in the top half of FIG. 8 may be used to precisely identify those sharers. However, when control circuitry monitors 7 a request for an additional sharer when there are already eight sharers holding cached data corresponding to the address, the encoding is switched to the imprecise encoding, and the sharer count values are set to indicate the number of sharers in each group of sharers that hold cached data corresponding to the address.

If the entry 26 is in the imprecise encoding and a sharer in the data processing system 2 evicts data corresponding to the address, the counter corresponding to the group containing that sharer may be decremented by 1 by control circuitry 7. Likewise, if a sharer allocates an entry to store data corresponding to the address, the counter for that group may be incremented by 1. The sharer count values 22 therefore provide a mechanism by which the number of sharers in a particular group holding data corresponding to an address can be indicated.

In both encodings shown in FIG. 8 for snoop filter entry 26, an indicator 23 can be provided which can be used to determine whether the entry is in the precise encoding or the imprecise encoding.

The snoop filter entry 26 shown in FIG. 8 uses 13 bytes of storage, compared to the 21 bytes used by the full precise encoding shown in FIG. 2A, and is therefore 1.61× smaller. It also provides the same degree of snoop request reduction when there are up to eight sharers actively holding data corresponding to an address. When there are more than eight sharers, the imprecise encoding also reduces snoop request traffic by signifying that snoop requests should only be issued to those groups associated with a non-zero counter. This example is also resistant to becoming stale, as the number of sharers can easily be identified for each sharer by the provision of sharer count values 22, and a snoop filter entry 26 may be deallocated or replaced when it is indicated that there are no sharers holding cached data corresponding to the address.

FIG. 9 shows a snoop filter entry 27 which has a similar structure to that shown in FIG. 8. However, the snoop filter 27 provides six fields to precisely identify sharers in the precise encoding compared to the eight of the snoop filter entry 26 shown in FIG. 8.

In the imprecise encoding of the snoop filter entry 27 shown in FIG. 9, there are the same number of sharer count values 28 as in the snoop filter entry 26 of FIG. 8. However, these sharer count values are encoded in fewer bits than in the snoop filter entry of FIG. 8.

The sharer count values in the snoop filter entry 27 of FIG. 9 are limited saturating sharer count values.

A saturating counter is a counter that may be incremented up to a certain value, at which any further increments do not increase the value of the counter. In the example of FIG. 9, the saturating value of each sharer count value is the maximum value that can be represented by the number of bits encoding the counter. The 3-bit counters 28 shown in FIG. 9 are capable of representing 8 different states. In one example these states represent the values 0-7, as it is desirable for a sharer count value to represent that no sharers in a group of sharers hold cached data corresponding to an address, and therefore should be capable of representing 0. If these counters were to saturate at the maximum value representable by the number of bits encoding the counter, the saturating value for these counters would be 7. This means that when a saturating counter according to FIG. 9 represents the value 7, any attempt to increment this value will result in the value remaining at 7. In comparison, if the counter represents any other value $0 \leq A < 7$, an increment will result in the value changing to A+1. When a saturating counter according to FIG. 9 represents the value 7 (the saturating value of the counter), an attempt to decrement this counter functions as usual, and the counter will be decremented to 6, for example.

If a sharer count value corresponding to M sharers is a saturating counter encoded with $\log_2(M)+1$ bits or more, as shown in the snoop filter entry of FIG. 8, it would not be expected to reach the saturating value. This is because there should not be a need for a counter to represent more sharers than the value the counter saturates at.

However, if the saturating counter is a limited saturating counter encoded with fewer than $\log_2(M)+1$ bits, the saturating value of the counter may be lower than the maximum number of sharers that the counter may be used to represent. In the example of FIG. 9, with each snoop entry supporting 128 potential sharers separated into 16 equally sized groups, N=128 and M=8. Therefore, the 3-bit counters are not encoded with sufficient bits to represent all possible numbers of sharers in a group, 0-8 (9 states, whereas a 3-bit counter can represent up to 8 different states), and saturate below the maximum value. In this case, if the number of sharers represented by a sharer count value equals or exceeds the saturating value at a given point, the value of that limited saturating counter is not expected to be indicative of the number of sharers from the point of incrementing to the saturating value (even in the absence of silent evictions). For example, if a sharer count value according to FIG. 9 is used to indicate the number of sharers in a group of 8 sharers that may each hold cached data corresponding to an address, and the saturating value of each sharer count value is 7, then when a group is associated with a sharer count value of 7, it is not known whether there are 7 or 8 sharers in that group holding cached data corresponding to the address.

It may be the case that the number of sharers that a sharer count value is used to represent during usual operation is much less than the maximum number of sharers that the sharer count value is capable of representing. As shown in FIG. 7, in many workloads there are often no more than two sharers holding cached data corresponding to a given address at any one time. Therefore, if a snoop filter entry as shown in FIG. 9 is in the imprecise encoding, it is unlikely that any one sharer count value corresponding to a group that is a subset of the total sharers will exceed the saturating value. Therefore, for regular workloads the counter acts as an ordinary counter capable of representing all sharers that may hold data corresponding to an address. Given that the limited saturating counter is encoded in fewer than $\log_2(M)+1$ bits, the counter uses fewer bits of storage than a counter capable of representing all M sharers. This allows the snoop filter to incur lower hardware costs. This can be seen by comparing the 16 4-bit counters of FIG. 8, which are capable of representing the maximum number of sharers, with the 16 3-bit counters of FIG. 9, which are not capable of representing the maximum number of sharers. The encoding according to FIG. 9 incurs 2 bytes less data storage cost. In a snoop filter comprising many entries, this storage saving can be significant. Compared to the snoop filter entry of FIG. 2A, the snoop filter entry of FIG. 9 uses 11 bytes of storage, which is 1.9× smaller than the entry of FIG. 2A.

In a case that at least one limited saturating counter is used to represent the number of sharers that hold cached data corresponding to an address, it can be useful to recover the accuracy of the sharer count value. The previous discussion of FIG. 9 has considered the case where a plurality of sharer count values are provided corresponding to a group of sharers, and each is provided as a limited saturating counter. Of course, any example of the present technique may implement any sharer count value as a limited saturating counter as described. As discussed, if the value reaches the saturating value at any point, it cannot be known if a value of that sharer count value accurately represents the number of sharers. As such, it can be useful for control circuitry to implement an accuracy check for limited saturating counters that may be liable to inaccuracies due to saturation.

Figure 10:
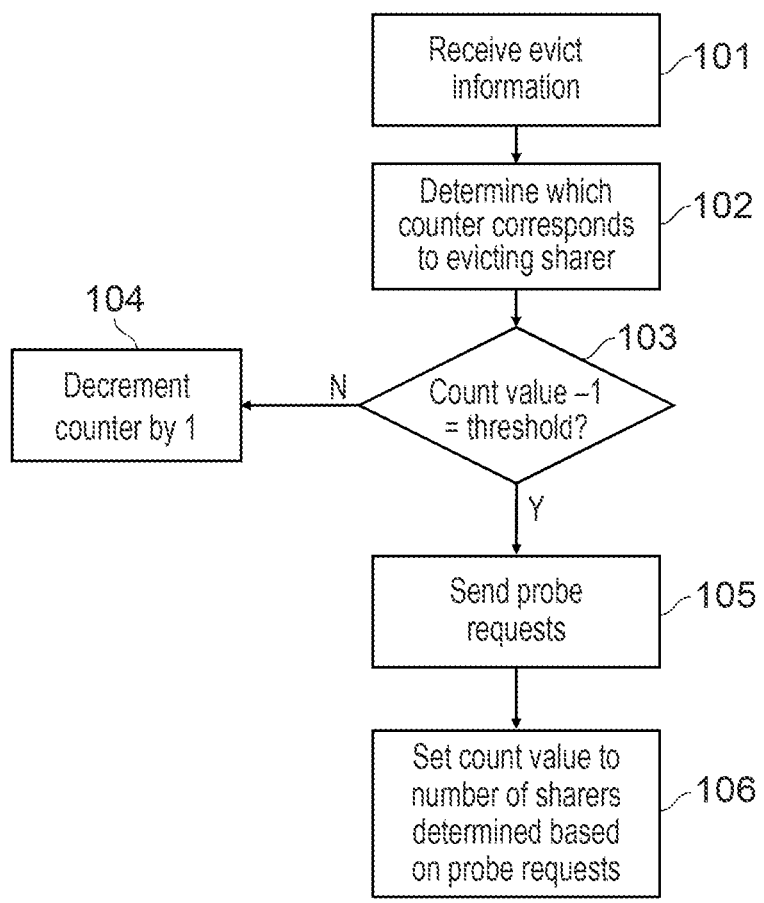
FIG. 10 is a flow diagram showing how the counters of FIG. 9 can be controlled and used to decide when to issue probe requests.

In one example accuracy check, probe requests are issued to all sharers in a group if the sharer count value associated with that group decrements to a certain threshold value at any time. This process is demonstrated in FIG. 10, which is a flow diagram showing how limited saturating sharer count values are controlled in a snoop filter entry in the imprecise encoding.

In step 101 control circuitry 7 monitors a transaction indicating that a sharer will no longer hold cached data corresponding to a given address. For example, this may be a message that a certain cache has evicted data corresponding to the address.

In step 102, control circuitry determines which sharer count value corresponds to the sharer that is evicting the cached data, as that sharer count value is the value that will be updated.

In step 103 it is determined whether decrementing the sharer count value will cause the sharer count value to take a predetermined threshold value.

If at step 103 it is determined that decrementing the sharer count value will not cause the value to take the threshold value, the counter is decremented as usual at step 104.

However, if it is determined that decrementing the sharer count value will cause the value to take the threshold value, probe requests are issued to all sharers corresponding to that sharer count value at step 105. An exemplary probe request to a given sharer will receive a response indicating whether or not the given sharer actively holds cached data corresponding to an address.

At step 106 the responses to the probe requests are used to set the value of the sharer count value. If the number of sharers indicated by the responses is less than the saturating value of the sharer count value, the sharer count value may be set to that number. If the number of sharers is above or equal to the saturating value of the sharer count value, the sharer count value is set to the saturating value.

By performing this check, sharer count values can be made accurate when they previously may have been inaccurate as a result of reaching a saturating value of the counter.

This described accuracy recovery may in some examples only issue probing requests when the saturating counter attempts to decrease from 1 to 0. The probing would recalculate the counter at this point to make sure that a 0-count is accurate. In this case the threshold value is set to 0. In this example, sharers may be probed even when the corresponding sharer count value has never reached the saturating value.

In other examples, sharers may be probed at a different sharer threshold. For example, probe requests may be issued when a counter is decremented from the saturating value X to X−1. In this example the sharer count value will be free from inaccuracies arising from reaching the saturating value when it is not in the saturated state, so no cache probes may be issued unless the cache line reaches the saturating value of X sharers.

One further example would be to set the threshold point at some intermediate threshold value other than at the minimum 1-to-0 transition or maximum (X)-to-(X−1) transition. This may be strike a better balance between common cases of low sharer counts (which would probe heavily on 1-to-0 transitions) and high/all sharer counts (which would probe heavily on evictions any time true sharer counts≥X).

Figure 11:
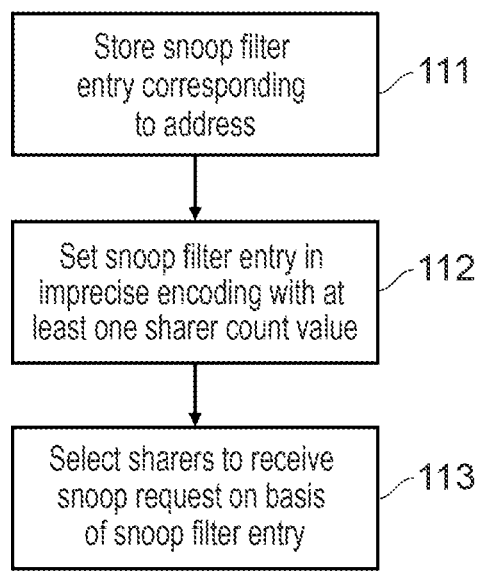
FIG. 11 is a flow diagram showing a method of controlling a snoop filter.

FIG. 11 is a flow diagram showing a method by which the control circuitry 7 can be used to control a snoop filter 8 and can control issuing of snoop requests using the entries of the snoop filter 8.

At step 111 control circuitry 7 sets a snoop filter entry to store sharer information corresponding to an address. For example, the control circuitry 7 may monitor a write transaction from a requester device 3, 4, 5 in a system 2 to cache data corresponding to an address in a sharer when there are no sharers actively holding cached data corresponding to the address.

At step 112, control circuitry sets the snoop filter entry corresponding to an address in the imprecise encoding. This involves setting at least one sharer count value 22 indicative of a number of sharers actively holding cached data corresponding to the address. For example, the control circuitry 7 may set a snoop filter entry to the imprecise encoding according to any of FIGS. 3, 5, 8, 9, or any other imprecise entry comprising a sharer count value.

At step 113, control circuitry 7 controls issuing of a snoop transaction. For example, a sharer may have requested data corresponding to an address, and a snoop request must be sent to every sharer that may hold a cached copy of data corresponding to that address in order to retrieve the most up-to-date version of the data and additionally control the coherency state information at those sharers. In order to minimise snoop traffic, control circuitry consults the entry in the snoop filter 8 corresponding to the address. Snoop requests are then sent according to the sharer information stored in the snoop filter entry. Although the steps 111-113 have been described in the order shown in FIG. 11, there is no requirement for this order to be followed in practice, and these steps may take place in any sequential order, or with steps in parallel.

As discussed, including at least one sharer count value 22 in a snoop filter entry set in the imprecise encoding can make it easier to identify entries that have no active sharers. This will now be discussed with reference to FIGS. 12A and 12B.

A snoop filter 8 has a limited number of entries. It is likely that there will be fewer snoop filter entries than addresses in memory. Therefore, in some examples there cannot be a snoop filter entry corresponding to every address at a given time. In these cases, control circuitry 7 may be unable to allocate a new snoop filter entry corresponding to an address without replacing an existing entry. For example, snoop filter storage circuitry may comprise a fully associative cache holding a maximum number of snoop filter entries, and therefore that cache is full. Alternatively, the snoop filter storage circuitry may comprise a set-associative cache, and it may be desirable to allocate a new snoop filter entry to a given set, but that set is full (even if there is space in another set, so the snoop filter as a whole is not full). In any case, it may be necessary to replace a previous entry. Sharer count values can be used to prioritise entries for replacement so that stale entries are prioritised for eviction over useful entries.

Alternatively, snoop filter entries can be deallocated from the snoop filter 8 before the snoop filter becomes full.

In a simple example, when there is a single sharer count value (see FIGS. 3 and 5), entries with a sharer count value 22 of zero can be deallocated. Alternatively, entries with a sharer count value 22 of zero can be prioritised for replacement. Entries with a sharer count value 22 of zero have no active sharers, and therefore the entry is stale. Identifying these stale entries using the sharer count value 22 reduces the chance of useful snoop filter entries that represent addresses with active sharers from being evicted.

However, as discussed, sometimes the sharer count value 22 does not precisely represent the true number of sharers in a system. In one example, a cache might evict cached data corresponding to an address silently, and therefore the control circuitry 7 does not monitor any transaction indicating that the sharer count value 22 should be decremented.

In these cases, when a snoop filter entry with a single sharer count value 22 has a low sharer count value 22, data corresponding to the address may in reality be cached by no sharers, but silent evictions have led to the sharer count value 22 not being decremented to zero. Therefore, it may also be the case that control circuitry prioritises replacement of entries with a lower sharer count value 22 over those with a higher sharer count value 22, with the understanding that the snoop filter entries with a low sharer count value are more likely to correspond to addresses with no sharers.

In a further example, there may be a plurality of sharer count values (see FIGS. 8 and 9). Here, entries with every sharer count value 22 being zero may be deallocated or prioritised for replacement. This prevents entries from becoming stale when there are no active sharers.

Figure 12A:
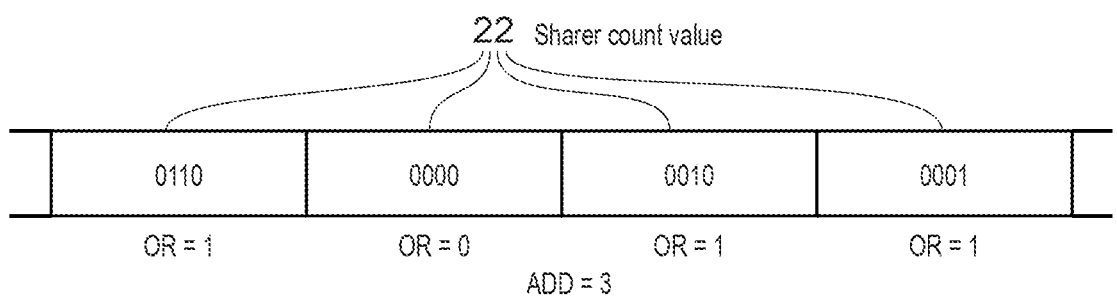
FIG. 12A shows a method of using counter values in a snoop filter entry to determine a number of non-zero counters.

However, in the case of silent evictions, the sharer count values 22 may each read a non-zero value when there are in fact zero sharers. One method for prioritising entries for deallocation or replacement in this case is shown in FIG. 12A. FIG. 12A shows a snoop filter entry such as that shown in FIG. 8 or FIG. 9, where each sharer count value 22 is represented by a 4-bit counter. In the method shown in FIG. 12A, the bits within each sharer count value 22 are ORed with each other. Therefore, if any sharer count value 22 represents a non-zero value, the result of the OR operation will be 1. Otherwise, if the sharer count value 22 corresponds to a value of zero, each of the bits will be 0 and the result of the OR operation will be 0. Adding the results of each OR operation yields a value that indicates the number of sharer count values 22 that are non-zero. In FIG. 12A, there are three non-zero sharer count values 22, and therefore the result of the add operation is three.

This can be an efficient way to identify snoop filter entries 22 with zero sharers, as the add result will be zero. Alternatively, it can be an efficient way to identify those snoop filter entries with fewer sharers, as these will typically have a lower number of non-zero sharer count values 22.

Entries can be prioritised for deallocation or replacement on the basis of the number of non-zero sharer count values 22 thus calculated.

Figure 12B:
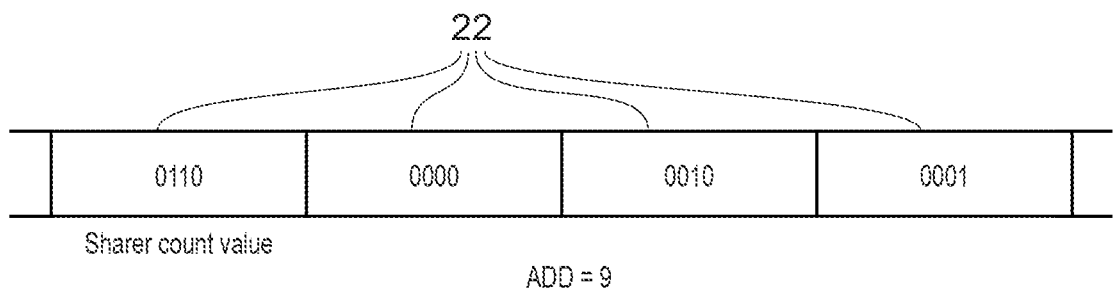
FIG. 12B shows a method of using counter values in a snoop filter entry to determine a number indicative of a number of sharers.

In another example, shown in FIG. 12B, every sharer count value 22 may be added together. This provides an indication of the total number of sharers holding cached data corresponding to an address. Entries can be prioritised for deallocation or replacement with a lower (or zero) value of the total number of sharers thus calculated.

However, the method shown in FIG. 12B is more computationally intensive than that shown in FIG. 12A. The OR operations followed by a single smaller add operation is more efficient than implementing several 4-bit additions as in FIG. 12B. As such, the more efficient method of FIG. 12A may be used, or the more accurate method of FIG. 12B may be used.

Figure 13:
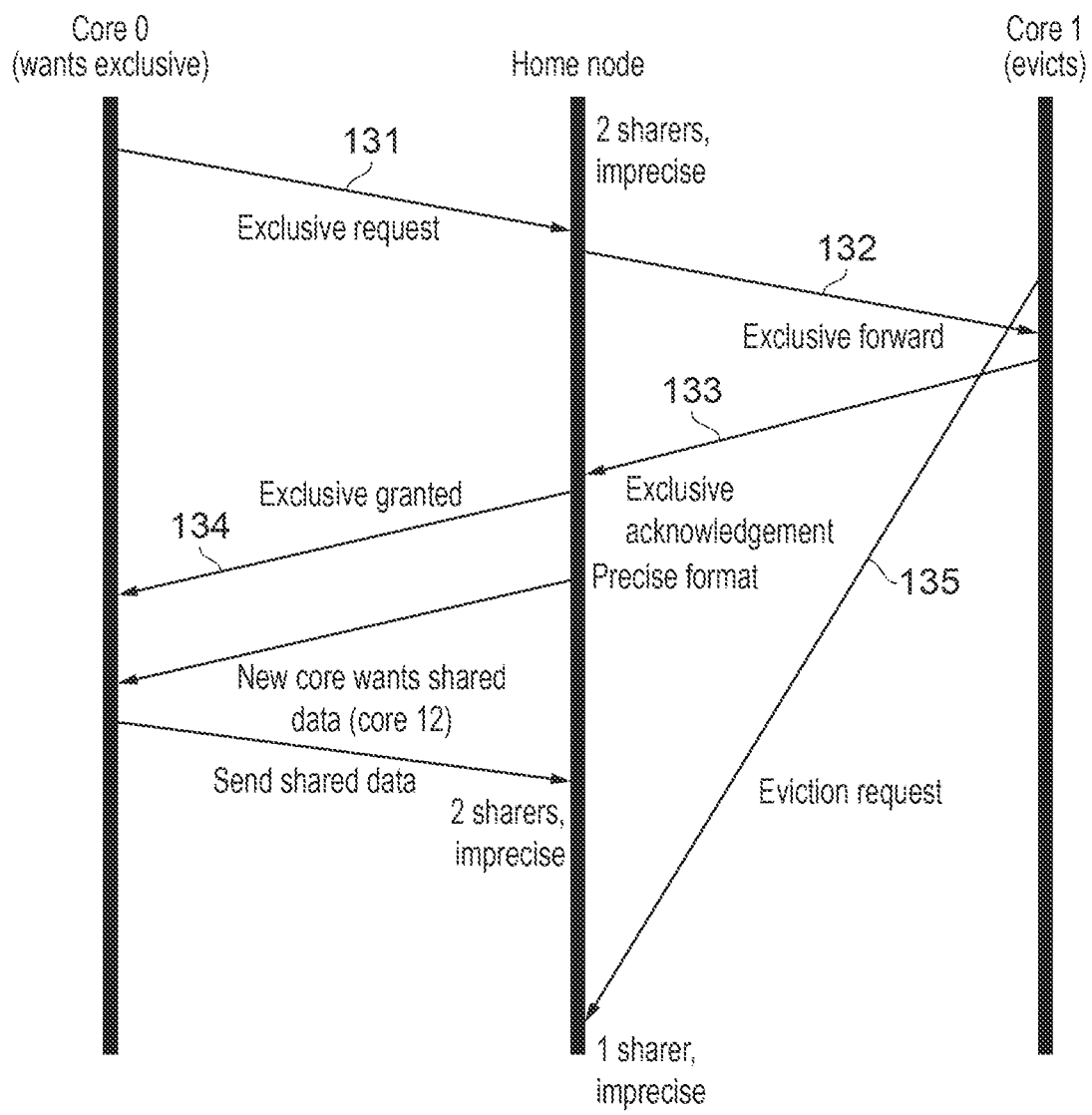
FIG. 13 is a ladder diagram showing a race condition that can arise in a system comprising a snoop filter.

FIG. 13 is a ladder diagram demonstrating a race condition that may arise in a system comprising a snoop filter with sharer count values, where the snoop filter entries are set in the encoding of FIGS. 3-4 (although a similar problem may arise in other encodings).

The illustrative system comprises sharers core 0, core 1, and core 12, and "Home node" which comprises control circuitry 7 and snoop filter 8.

Initially, the snoop filter entry corresponding to an address indicates that there are two sharers holding cached data corresponding to the address with the snoop filter entry in the imprecise encoding. One of these sharers is core 1.

Core 0 requests 131 unique access to the data corresponding to the address. This causes control circuitry 7 at the home node to issue snoop requests 132 to all sharers indicated by the snoop filter 8 as holding cached data corresponding to the address. The snoop request 132 may request a sharer to provide the most up-to-date copy of data corresponding to the address (if the data is held as dirty at the sharer) and set the coherency state of cache entries corresponding to the address to invalid.

Core 1, before receiving the snoop request 132 from control circuitry 7 independently decides to stop holding cached data corresponding to the address, issuing an eviction request 135 indicating that core 1 is evicting the data.

Core 1 then receives the snoop request 132 from control circuitry 7 and issues a response 133.

When control circuitry 7 at the home node receives a certain number of responses 133 to the snoop requests 132 issued to sharers, it may decide to grant the request of core 0 and allow core 0 to uniquely hold data corresponding to the address. The snoop filter entry corresponding to the address is then set to the precise encoding identifying core 0.

A separate sharer, core 12, then requests access to data corresponding to the address. In the case that this request is granted, there are two sharers holding this data (core 0 and core 12), and therefore the snoop filter entry is set in the imprecise encoding to reflect this. In the snoop filter entries of FIG. 3, for example, or any other snoop filter entry where two sharers cannot be represented in a precise encoding, the snoop filter entry is set in the imprecise encoding. There may be a single sharer count value identifying two sharers, or a plurality of sharer count values corresponding to different groups, set to identify the two sharers.

Either way, the eviction request 135 sent by core 1 prior to receiving the snoop request 132 from the home node finally reaches the control circuitry after the snoop filter entry has been set in the imprecise encoding after temporarily being in the precise encoding. The eviction request 135 might have been delayed due to being held in a low priority queue.

When this eviction request 135 is read by the control circuitry 7, it may be used to decrement a sharer count value 22 in the snoop filter entry. This is because with the snoop filter entry in the imprecise encoding, the control circuitry cannot generally identify that core 1 is not an active sharer. Therefore, although the only two active sharers are core 0 and core 12, a stale eviction request from core 1 has been used to erroneously decrement a sharer count value.

In some examples, an apparatus according to the present technique implements features for reducing the risk of the described race condition.

For example, information included in the responses 133 to snoop requests 132 may be used to determine whether or not there is a risk of one of the snooped sharers being in the process of evicting data corresponding to an address. If the control circuitry determines that there is a risk of a pending eviction for a sharer holding data corresponding to an address, it may suppress the decrementing of a sharer count value corresponding to the address, or may set information indicating that a future message 135 indicating an eviction not cause the sharer count value to be decremented.

In some examples, the information included in the snoop responses used to determine the risk may be a pending eviction indicator. In one example, this may be a 1-bit flag that can be set in one of two states, indicating either that the sharer corresponding to the snoop response is in the process of an eviction or that it is not. Other indicators may be used to represent this information. In the example of FIG. 13, snoop response 133 would include a flag indicating that core 1 is in the process of evicting data corresponding to the address, which can be determined on the basis that core 1 has issued an eviction request 135 but has not received an acknowledgement from control circuitry of this request. Core 1 may keep outstanding requests in a buffer so it has information to avoid race conditions.

In some examples, the information included in the snoop response 133 used to determine the risk of a pending eviction may be coherency state information. For example, coherency state information may comprise an indication of whether the data corresponding to the address in a particular sharer is clean, dirty, unique, shared, invalid, etc. This may be used to assess the risk of a pending eviction. For example, if coherency state information in a snoop response 133 indicates that, at the time of receiving the corresponding snoop request 132, the coherency state for the specified address at a given sharer is an invalid coherency state, there may be a risk that an eviction message 135 was pending at the time the snoop response 133 was sent. For example, sharer information in the snoop filter 8 may indicate that core 1 holds cached data corresponding to the address (because the control circuitry has not yet received the eviction request to update the corresponding snoop filter entry) and the snoop response may therefore be expected to include not-invalid coherency state information. However, due to the eviction, core 1 may have updated its coherency state to invalid, and therefore the snoop response 133 would read invalid, indicating that the pending eviction message 135 is still outstanding.

In response to determining that there is a risk of a pending eviction request 135 using the snoop response 133, control circuitry 7 may in some examples prevent the unique request 131 from being granted. In some examples, a unique request may not be granted until all pending eviction requests 135 have been acknowledged. In some examples, a unique request may be cancelled if another core requests access to data corresponding to the address whilst the unique request has not been granted (for example, in FIG. 13 the exclusive request 131 would be cancelled upon receiving the access request from core 12).

In some examples, control circuitry 7 may not decrement a sharer count value 22 corresponding to a sharer in response to receiving a snoop response 133 from that sharer indicating invalid coherency state. Granting a unique access request 131 and/or entry into the precise format of the snoop filter entry may be delayed until a threshold number of snoop responses not indicating invalid coherency state have been received by control circuitry. Hence, for core 1, the relevant message triggering the decrementing of the sharer count value 22 would be eviction request 135, rather than exclusive acknowledgement 133. This means that, in the case when no request for shared data at the address is received from another core in the period between receiving exclusive acknowledgement 133 and receiving eviction request 135, granting of the unique access request and/or entry into the precise format can be delayed until the eviction request 135 has been received, avoiding the race condition mentioned above. In the case when the request from core 12 is received in the period between receiving messages 133, 135, no decrement of the sharer count is performed in response to exclusive acknowledgement 133 (due to specifying the invalid state), an increment of the sharer count may then occur in response to the request for shared data from core 12, and then receipt of eviction request 135 causes a decrement of the sharer count. As a result of the additional increment due to the request from core 12, the sharer count may not get low enough to allow entry into the precise format at all (depending on the format of the snoop filter entries implemented—if one of the examples which support two or more sharer identifier fields in the precise format is used, allowing multiple different sharers to be implemented precisely, then even in the presence of two sharers it may be possible to use the precise format).

In some examples, information may be set by control circuitry 7 to indicate that a next eviction request 135 from a core with a pending eviction request is not used to decrement a sharer count value. In the example of FIG. 13, this means that stale eviction request 135 would not decrement the sharer count value, and that inaccuracy of the sharer count value arising from the race condition would be made less likely.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   snoop filter storage circuitry to store snoop filter entries corresponding to addresses and comprising sharer information, and
   control circuitry to select which sharers, among a plurality of sharers capable of holding cached data, should be issued with snoop requests corresponding to a target address, based on the sharer information of the snoop filter entry corresponding to the target address, wherein
   the control circuitry is capable of setting a given snoop filter entry corresponding to a given address to an imprecise encoding in which:
      the sharer information provides an imprecise description of which sharers hold cached data corresponding to the given address at a granularity less precise than the granularity of a sharer, and
      the given snoop filter entry comprises at least one sharer count value indicative of a number of sharers holding cached data corresponding to said address.

2. The apparatus according to claim 1, wherein the control circuitry is capable of setting the given snoop filter entry to a precise encoding providing a description of at least one specific sharer indicated as holding cached data corresponding to the given address, the precise encoding identifying said at least one specific sharer at granularity of an individual sharer.

3. The apparatus according to claim 2, wherein the control circuitry is configured to switch the given snoop filter entry from the imprecise encoding to the precise encoding in response to receiving a request from a sharer requesting that the sharer uniquely holds cached data corresponding to the given address.

4. The apparatus according to claim 2, wherein the control circuitry is configured to switch the given snoop filter entry from the precise encoding to the imprecise encoding when an update to the given snoop filter entry to account for an additional sharer holding the cached data corresponding to the given address would require identification of a number of sharers exceeding a maximum number of sharers representable by the precise encoding.

5. The apparatus according to claim 2, wherein the sharer information comprises an encoding indicator indicative of whether the given snoop filter entry has the precise encoding or the imprecise encoding.

6. The apparatus according to claim 2, wherein the control circuitry is configured to identify a potential opportunity to switch the given snoop filter entry from the imprecise encoding to the precise encoding on the basis of at least one sharer count value of the snoop filter entry.

7. The apparatus according to claim 1, wherein a maximum number of sharers supported by the control circuitry is N sharers, and a number of bits used to encode the sharer information and the at least one sharer count value in the imprecise encoding is lower than N.

8. The apparatus according to claim 1, wherein in the imprecise encoding, the sharer information comprises a plurality of coarse sharer values each indicating whether a respective group of sharers is indicated as holding cached data corresponding to the given address.

9. The apparatus according to claim 1, wherein in the imprecise encoding the given snoop filter entry comprises a plurality of sharer count values, each sharer count value indicative of a number of sharers within a respective group of sharers indicated as holding cached data corresponding to the given address.

10. The apparatus according to claim 1, wherein when the given snoop filter entry has the imprecise encoding, the control circuitry is configured to deallocate the given snoop filter entry when the at least one sharer count value is zero.

11. The apparatus according to claim 1, wherein when at least one snoop filter entry has the imprecise encoding, the control circuitry is configured to control snoop filter entry replacement based on the at least one sharer count value of the at least one snoop filter entry.

12. The apparatus according to claim 11, wherein the control circuitry controls snoop filter entry replacement by prioritising replacement of entries with one of:
a lower value of at least one sharer count value, or
at least one sharer count value of zero.

13. The apparatus according to claim 1, wherein the given snoop filter entry comprises cached data corresponding to said address.

14. The apparatus according to claim 1, wherein in response to receiving a request from a unique requesting sharer requesting that the unique requesting sharer uniquely holds cached data corresponding to the given address when the snoop filter entry corresponding to the given address is encoded in the imprecise encoding, the control circuitry is configured to send exclusive snoop requests to sharers indicated as holding data corresponding to the given address, and
the control circuitry is configured to use information included in a response to a given exclusive snoop request received from a given snooped sharer, to determine whether there is a risk of an outstanding eviction message still remaining pending from the given snooped sharer, the outstanding eviction message comprising a message, other than the response to the given exclusive snoop request, indicating that the given snooped sharer is in the process of evicting cached data corresponding to the given address, and
when the control circuitry determines that there is a risk of the outstanding eviction message still remaining pending for the given snooped sharer, the control circuitry is configured to:
suppress decrementing of a sharer count value in response to said response to the given exclusive snoop request, or
set information indicating that a future eviction message from the given snooped sharer for the given address should not cause the sharer count value to be decremented.

15. The apparatus according to claim 14, wherein the information included in the response to the given exclusive snoop request comprises a pending eviction indicator specifying whether the given snooped sharer has said outstanding eviction message still remaining pending for the given address.

16. The apparatus according to claim 14, wherein the information included in the response to the given exclusive snoop request comprises coherency state information associated with the given address at the given snooped sharer at a time of responding to the given exclusive snoop request.

17. An apparatus comprising:
snoop filter storage circuitry to store snoop filter entries corresponding to addresses and comprising sharer information, and
control circuitry to select which sharers, among a plurality of sharers capable of holding cached data, should be issued with snoop requests corresponding to a target address, based on the sharer information of the snoop filter entry corresponding to the target address, wherein
the control circuitry is capable of setting a given snoop filter entry corresponding to a given address to an imprecise encoding in which:
the sharer information provides an imprecise description of which sharers hold cached data corresponding to the given address, and
the given snoop filter entry comprises at least one sharer count value indicative of a number of sharers holding cached data corresponding to said address;
wherein a maximum number of sharers in a group of sharers corresponding to a given sharer count value is M sharers, and said sharer count value comprises a limited saturating counter encoded with fewer bits than $\log_2(M)+1$ bits.

18. The apparatus according to claim 17, wherein the control circuitry is configured to issue probe requests to sharers corresponding to a given limited saturating counter of the given snoop filter entry when the given limited saturating counter decrements to a predetermined value, the probe requests comprising requests for checking whether the sharers still hold the cached data corresponding to the given address.

19. The apparatus according to claim 18, wherein the predetermined value is one of:
zero;
X−1, where X is a saturation value of the given limited saturating counter; and
an intermediate value between zero and X−1.

20. A method comprising:
storing snoop filter entries corresponding to addresses and comprising sharer information, selecting which sharers, among a plurality of sharers capable of holding cached data, should be issued with snoop requests corresponding to a target address, based on the sharer information of the snoop filter entry corresponding to the target address, and
setting a given snoop filter entry corresponding to a given address to an imprecise encoding in which:
the sharer information provides an imprecise description of which sharers hold cached data corresponding to the given address at a granularity less precise than the granularity of a sharer, and the given snoop filter entry comprises at least one sharer count value indicative of a number of sharers holding cached data corresponding to said address.

* * * * *